(12) United States Patent
Natsume

(10) Patent No.: US 8,607,215 B2
(45) Date of Patent: Dec. 10, 2013

(54) ELECTRONIC CONTROL SYSTEM FOR REWRITING CONTROL SOFTWARE IN AN AUTOMOBILE

(75) Inventor: Mitsuyoshi Natsume, Hekinan (JP)

(73) Assignee: Denso Corporation, Kariya (JP)

( * ) Notice: Subject to any disclaimer, the term of this patent is extended or adjusted under 35 U.S.C. 154(b) by 470 days.

(21) Appl. No.: 12/805,254

(22) Filed: Jul. 21, 2010

(65) Prior Publication Data

US 2010/0313192 A1    Dec. 9, 2010

Related U.S. Application Data

(62) Division of application No. 11/407,130, filed on Apr. 20, 2006, now abandoned.

(30) Foreign Application Priority Data

Apr. 20, 2005 (JP) ................................ 2005-122734
Apr. 22, 2005 (JP) ................................ 2005-125518

(51) Int. Cl.
*G06F 9/44* (2006.01)

(52) U.S. Cl.
USPC ........................................ 717/168; 717/173

(58) Field of Classification Search
USPC ................................................ 717/168, 173
See application file for complete search history.

(56) References Cited

U.S. PATENT DOCUMENTS

| | | | |
|---|---|---|---|
| 5,764,992 A | 6/1998 | Kullick et al. |
| 5,826,205 A | 10/1998 | Koelle et al. |
| 5,991,635 A | 11/1999 | Dent et al. |
| 6,167,344 A | 12/2000 | Fackler et al. |
| 6,249,848 B1 | 6/2001 | Terada et al. |
| 6,275,911 B1 | 8/2001 | Terada et al. |
| 6,438,432 B1 | 8/2002 | Zimmermann et al. |
| 6,477,626 B1 | 11/2002 | Terada et al. |
| 6,505,280 B2 | 1/2003 | Terada et al. |
| 6,640,334 B1 | 10/2003 | Rasmussen |

(Continued)

FOREIGN PATENT DOCUMENTS

| | | |
|---|---|---|
| JP | 2000-293440 | 10/2000 |
| JP | 2001-229014 | 8/2001 |

(Continued)

OTHER PUBLICATIONS

Beasley et al. (PCT publication WO 96/32679, dated 1996).*
Japanese Office Action dated Jan. 4, 2010, issued in corresponding Japanese Application No. 2005-122734, with English translation.
Japanese Office Action dated Mar. 16, 2010, issued in corresponding Japanese Application No. 2005-125518, with English translation.
Official Action dated Aug. 31, 2010, issued in parent U.S. Appl. No. 11/407,130, of Natsume et al, filed Apr. 20, 2006.

*Primary Examiner* — Li B Zhen
*Assistant Examiner* — Hang Pan
(74) *Attorney, Agent, or Firm* — Nixon & Vanderhye PC

(57) ABSTRACT

In an ECU, a flash ROM has a main storage area for storing a current version of an application program and a sub-storage area for storing update version program that includes updated points from the current version program. A rewriting tool executes program rewrite processing including: store processing of storing the update version program in the sub-storage area; and memory changeover processing in which, when the writing of the update version program in the sub-storage area has been done successfully, the sub-storage area where the storing of the update version program has ended is changed over to a new main storage area instead of a memory area currently being used as the main storage area. When the writing in the sub-storage area has failed, the changeover is not conducted.

8 Claims, 22 Drawing Sheets

(56) References Cited

U.S. PATENT DOCUMENTS

| | | |
|---|---|---|
| 6,745,224 B1 | 6/2004 | D'Souza et al. |
| 6,883,060 B1 | 4/2005 | Hayama |
| 6,957,296 B2 | 10/2005 | Terada et al. |
| 6,990,659 B1 * | 1/2006 | Imai .............................. 717/171 |
| 7,000,140 B2 | 2/2006 | Okubo et al. |
| 7,086,049 B2 * | 8/2006 | Goodman .................... 717/168 |
| 7,689,981 B1 * | 3/2010 | Gustafson .................... 717/168 |
| 2003/0041217 A1 | 2/2003 | Terada et al. |
| 2003/0221049 A1 | 11/2003 | Oguri et al. |
| 2004/0034861 A1 | 2/2004 | Ballai |
| 2006/0259207 A1 | 11/2006 | Natsume |

FOREIGN PATENT DOCUMENTS

| | | |
|---|---|---|
| JP | 2002-024044 | 1/2002 |
| JP | 2003-172199 | 6/2003 |
| JP | 2004-034854 | 2/2004 |
| JP | 2004-210183 | 7/2004 |
| JP | 2004-249914 | 9/2004 |
| JP | 2005-100428 | 4/2005 |

* cited by examiner

ELECTRONIC CONTROL SYSTEM FOR REWRITING CONTROL SOFTWARE IN AN AUTOMOBILE

CROSS REFERENCE TO RELATED APPLICATION

This application is a Division of application Ser. No. 11/407,130, filed Apr. 20, 2006 and is based on Japanese Patent Applications No. 2005-122734 filed on Apr. 20, 2005 and No. 2005-125518 filed on Apr. 22, 2005, the disclosures of each of which is incorporated by reference.

FIELD OF THE INVENTION

The present invention relates to an electronic control system for an automobile.

BACKGROUND OF THE INVENTION

Automobiles are equipped with electronic control units (ECUs) each for controlling various electronic apparatuses to be controlled. Each ECU has a main control unit composed of a CPU, and performs control processing of electronic apparatuses mounted on the automobile based on execution of predetermined control software. This control software is recently stored in a flash ROM (flash memory) so that its contents can be updated at any time for version-ups, correction of bugs, etc. of stored application programs (U.S. Pat. No. 6,249,848 corresponding to JP 10-111863A; US 20030221049A1 corresponding to JP 2003-337748A; JP 2003-172199A; and JP 2001-229014A).

Conventionally, update processing of an application program is often done in a car dealer shop etc. into which the owner brings in a vehicle. In recent years, the spread of vehicle external infrastructures using radio communication (for example, a portable phone network etc.) is paving a way to possible scenario of addition of functions and updating of map data in a car navigation system, distribution of music software used by the car audio system, etc. which might be executed by the users themselves. In this case, the update processing is performed by downloading an update version of control software by wireless reception from the external infrastructure and writing it in a flash ROM, while the user is using a vehicle.

The stored program is updated to a new version, while the old version control software is being used by the user. The rewrite processing is performed by overwriting (or invalidating) an old version of control software in the flash ROM. In case where the rewrite processing of a new version of software has failed for some reason (for example, communication failure, bugs and erroneous operation of rewrite processing, hardware abnormality, etc.) during the rewrite processing, old version software as well as new version software becomes unusable or suffers dysfunction. This causes serious influence on providing functions to the user.

Further, when the update processing is to be performed, it is necessary to perform version-up processing of the application program (function controlling software) of an automobile using a program for rewriting (rewriting firmware) prepared apart from the function controlling software. In the case of an ECU carried on an automobile, in contrast to OS etc. of a personal computer, it is rare that the users direct their attentions to rewrite processing itself regarding version-up of the mounted application program. In most cases, a person in charge of a dealer shop performs the rewrite processing actually. For example, in the case where the ECU is configured to start an extra routine regarding rewriting of the application program when the ECU is restarted after resetting, not only the ECU does not operate automobile functions that the user usually enjoys but also transfers into an input waiting state of the rewrite processing, which the user can hardly understand and may be driven into confusion. By such a reason, when restarting the ECU after resetting it, the ECU is configured in such away that a main body part (function realizing program part) of the application program starts always before the rewriting program. In the case where the ECU is intended to transfer to the rewrite processing, the rewriting firmware is started by command input from this application program specifically, in one of execution steps of the above application program, the rewriting firmware receives a start command being entered from an interface for maintenance that general users do not operate usually. For example, it is realized in a touch panel screen that is called by an exclusive command or by input tool connection to an exclusive connector.

Meanwhile, when the rewrite processing is performed in such a way that an update version program is overwritten on an old version program (invalidated) in a flash ROM, there is a case where the rewrite processing fails because of some cause (for example, electric power cutoff of the ECU, communication failure, bugs and erroneous operation of the rewrite processing, hardware abnormality, and connector dropout in the case where rewriting is performed with an exclusive rewriting tool bearing the update version program being connected to an in-vehicle network, and the like) during the rewrite processing of the update version program. In this case, the failure causes the old version program as well as the update version program to be unusable or fall into dysfunction, which gives serious effects on providing functions to the user. As a natural consequence of this, it is required to perform again the rewrite processing of the application program.

However, like the above conventional ECU, when the rewriting firmware is configured to receive the start instruction from the application program side, once the rewrite processing of the application program fails, normal start of the application program cannot be expected at all after that. As a result, it is no longer possible to start the rewriting firmware in order to repair this. Therefore, re-execution of the rewrite processing will become impossible. In this case, what is required in order to solve this problem is to remove the ECU, attach it to an exclusive apparatus, and rewrite the contents of the flash ROM that stores the application program. However, it takes much time to remove the ECU mounted in a deep location of the vehicle body, which will lead to waste of unexpected time and labor for normal restoration.

SUMMARY OF THE INVENTION

The present invention therefore has a primary object to provide an electronic control system for an automobile that can perform rewrite processing of control software stored in a nonvolatile memory in such a way that even when the rewriting fails, the system can ensure providing of functions to a vehicle user.

The present invention has a secondary object to provide an electronic control system for an automobile equipped with a function of, even when rewrite processing of controlling software loaded on a nonvolatile memory fails by any chance, being able to perform the re-rewrite processing surely.

According to a first aspect of the present invention for attaining the primary object, a main storage area for storing the current version program of a control software and a substorage area for storing a newly acquired update version program are provided in a nonvolatile memory for storing the control software, and the update version program acquired from the outside is stored in a sub-storage area that is allocated separately from the main storage area for storing the current version program currently being used. Then, when the writing of the update version program in the sub-storage area has been done successfully, the sub-storage area in which storing of the update version program has ended is changed over to a new main storage area instead of the memory area currently being used as the main storage area. When the writing in the sub-storage area has failed, the changeover of the storage area is not conducted. By this, even when the writing of the update version program has failed, the current version program remains undamaged in the main storage area, processing of changing over the sub-storage area where only incomplete update version program is written to the main storage area is not conducted. Accordingly, the current version program can be used continuously, which ensures a capability of providing functions to the user even at the time of failure of rewriting.

The nonvolatile memory provides its storage area that is divided into a plurality of rewriting unit blocks and such that erasing, writing and rewriting of the storage contests are made possible only on a rewriting unit block basis (typical example is flash memory or flash ROM). In this case, it is desirable that the main storage area and the sub-storage area are formed in mutually different rewriting unit blocks.

For example, recently the development in the capacity of the flash memory has been progressing rapidly to achieve the capacity large enough to store control software of a large size. In the present aspect, when the program is described in the address space in a relocatable manner, it is even possible to form the main storage area and the sub-storage area in a memory space with appropriate varying locations in the memory space, considering the size and location of a free area in the memory. Although, the storage contents of the flash memory can be rewritten electrically, it is impossible to rewrite in bits as in a RAM, that is, the flash memory has a physical structure that allows rewriting only in blocks of a fixed size because the drive voltage at the time of reading and the drive voltages at the time of erasing differs from each other. With this structure, when the main storage area and the sub-storage area are set in the memory not being limited by locations in the address space allocated in the nonvolatile memory, it is likely that both the main storage area and the sub-storage area are formed in the same rewriting unit block. There is a risk that the program data in the main storage area may be broken when, for example, there occurs a trouble, such as erroneous operation, at the time of writing an update version in the sub-storage area. Contrary to this, when the main storage area and the sub-storage area are formed in mutually different rewriting unit blocks, such a trouble will not occur.

In this case, the nonvolatile memory has the first memory and the second memory that are formed as a fixed memory consisting of a group of their own rewriting unit blocks, and the program rewriting means may be configured to form the sub-storage area alternately in the first memory and the second memory. Thus, it specifies in which one of the first memory and the second memory the main storage area and the sub-storage area are alternately formed, respectively, each time an update version program is newly acquired for the same control software, whereby processing of executing program update processing of the same control software repeatedly can be performed simply and rationally. Moreover, as a natural consequence of adoption of this system, in the memory area that is used for formation of the sub-storage area, only a former version program older than the current version program is stored, and consequently the degree of freedom of overwriting and erasing is high. Consequently, in writing an update version program, extra processing, such as data saving etc., can be kept to a minimum, and the processing needs a fewer number of steps of read-and-write processing. In this case, when the program rewriting means sets up the sub-storage area in such a way that the sub-storage area is rewritten over a memory that the previous version program older than the current version program used as there main storage area, it is possible to keep a memory area that will be newly consumed at the time of rewriting to a minimum, effectively utilizing the capacity of the volatile memory.

Here, the above first memory and the above second memory can be formed being partitioned in a memory space of the same nonvolatile memory chip, or the first memory and the second memory can be formed in individual nonvolatile memory chips. In the former case, the number of nonvolatile memory chips is reduced, contributing to reduction in hardware cost. However, there is a problem in which, when hardware abnormality of the nonvolatile memory chip occurs, both the first memory and the second memory causes errors. On the other hand, in the latter case where the first memory and the second memory are formed in individual nonvolatile memory chips, hardware cost increases because of extra nonvolatile memory chip, switching mechanism for switching over memory, and the like become necessary. However, there is an advantage that even when one of nonvolatile memory chips is broken, the other nonvolatile memory chip can be utilized as a chip for back up.

Next, program rewriting means can be configured to write the update version program along with version information for specifying the version in the sub-storage area. In this case, it is possible to provide a control software starting means that, in executing the control software after the updating, accesses to storage areas of programs of different versions that are stored in the first memory and in the second memory, respectively, reads and compares version information given to the respective programs, and uses a program, that was identified as a new version, as a current version program. Since in the present aspect, the current version program and the update version program of the same control software temporarily co-exist in the nonvolatile memory, the both program can be identified properly, so that a trouble of erroneously executing the old version program after the updating can be prevented.

In this case, the program rewriting means can be configured to write the update version program along with the normal termination information in the sub-storage area in response to the normal termination of the update version program. Moreover, the control software starting means can be configured to permit only a program having the normal termination information to be started. That is, in the case where a program to be executed is determined only by identification of the above version information, the following contradiction is brought about: even in the case where writing has not normally ended, when only the version information is renewed, the incomplete program will be executed. On the contrary, by writing normal termination information along with the version information, it can be properly grasped whether the update version program has been written so as to be usable normally, and thus such contradiction can be eliminated. In this case, when the version information indicates a new version and is accompanied with the normal termination information, the update version program is put for execution and as a result the sub-storage area was changed over to the main storage area.

The first memory and the second memory can be specified to store a plurality of control programs having different functions, respectively. In this case, the program rewriting means can be configured so as to determine independently in which memory the main storage area and the sub-storage area will be formed each time program updating occurs in individual control software. Consequently, the main storage areas and the sub-storage areas of each of different control software will be formed mixedly in the first memory and in the second memory depending on the number of updating the each control software. However, by writing the version information described above, the main storage area and the sub-storage area of each of various control software that are formed mixedly can be identified without problems, so that for each of multiple pieces of control software coexisting in the nonvolatile memory a trouble of erroneously executing an old version of a program after updating can be prevented.

The above nonvolatile memory can be kept to store the rewriting firmware that is function realizing firmware of the program rewriting means. In this case, the CPU can be programmed to perform the program rewrite processing independently from execution processing of the current version program when the update version program was acquired. By this, the CPU can perform program rewrite processing in the background of execution processing of the current version program, and accordingly it becomes possible to reduce or eliminate a period when functions based on the targeted control software is unusable because of program rewriting.

In this case, there can be provided control-software start controlling means for controlling start states of multiple pieces of control software and common operation rest period specifying means that specifies the common operation rest period in which all pieces of control software commonly halt their operations based on a start control state by the control-software start controlling means. The rewriting firmware can be designed as one that performs program rewrite processing in the specified common operation rest period. With this configuration, since the program rewrite processing is performed using a rest period that is common to multiple pieces of control software, individual control software becomes less prone to suppression resulting from a load of background processing for program rewriting. Accordingly; this configuration makes it possible to effectively inhibit a trouble in which a processing speed of specific control software reduces extremely, an operation response of an automobile function corresponding to the control software is delayed, and the like.

In this case, when the rewriting program is made to perform the program rewrite processing using time division processing that extends over two or more common operation rest periods coming one by one in a sequential manner, the above effect can be enjoyed even in the case where the update target control software is large in size.

For example, in the case where the control-software start controlling means has a scheduler for starting and controlling execution tasks of multiple pieces of control software periodically in a predetermined time series sequence, the rewriting firmware can be configured as software that, when performing program rewriting process, conducts time division processing in such a way that a task of program rewrite processing is incorporated in an execution task array of a plurality of application programs in the scheduler. By this configuration, it is possible to effectively prevent a trouble in which a load by background processing (as viewed from an individual application program) of program rewriting is imposed unequally to a specific application program.

In the above mode, the scheduler also serves as common operation rest period specifying means, and is configured to form the common operation rest period compulsorily by incorporating a task of program rewrite processing in the execution task array of the application program. Alternatively, it is also possible for the common operation rest period specifying means to specify the common operation rest period as a period when there is no outside start request to any of a plurality of application programs. In this case, there can be provided sleep controlling means so that, when the update version program is not acquired in the common operation rest period, the CPU is subjected to sleep setting that shifts the CPU to a sleep mode with a smaller amount of power consumption than the normal operating mode. When the update version program is acquired in the common operation rest period, program rewrite processing by rewriting firmware is started. That is, the program rewrite processing is started after the coming of a period of such light processing load that, there is no operation request for automobile functions corresponding to any application program and, when it is a normal state, the CPU is made to enter a sleep mode, whereby it is possible to reduce a possibility that execution processing of each of application programs is suppressed.

According to a second aspect of the present invention for attaining the secondary object, each time the rewrite processing of function controlling software is performed, information as to whether it has normally completed is stored as rewriting-state identifying information every time. Then when the function controlling software is tried to be started next, first the content of rewriting-state identifying information is referred to, not that the function controlling software is started immediately. As a result, in case where it is turned out that the pervious rewrite processing was faulty, rewriting firmware is started again instead of the function controlling software. That is, the start command of the rewriting firmware is not executed inside the function controlling software, but the start controlling means that is independent from the function controlling software refers to the rewriting-state identifying information and subsequently restarts the rewriting firmware independently. Therefore, even when rewriting of the function controlling software fails, re-rewrite processing of it can be performed surely.

The identifying information rewriting means invalidates the storage state of the rewriting-state identifying information storage part as of before starting the rewriting firmware at the time of starting the firmware, and subsequently sets the storage state of the rewriting-state identifying information storage part to a predetermined rewriting-normally-completed state that indicates rewriting normal completion after the rewriting firmware has normally completed the rewrite processing of the function controlling software in the nonvolatile memory. The start controlling means can be configured to start the function controlling software only when the memory content of the rewriting-state identifying information storage unit is the rewriting-normally-completed state. It can be determined surely whether the rewriting of the function controlling software is succeeded by invalidating the content of the rewriting-state identifying information storage part at the time of rewriting the function controlling software and by setting the content of the rewriting-state identifying information storage part to the rewriting-normally-completed state when the rewrite processing has normally completed. As a result, this also makes it possible to shift smoothly to the re-rewrite processing by the rewriting firmware in the case of unsuccess.

The identifying information rewriting means sets the memory content of the rewriting-state identifying information storage part to a predetermined under-rewriting state that indicates under-rewriting in response to the start of the rewrite processing of the function controlling software by the rewriting firmware, and also maintains the under-rewriting state until the rewrite processing of the function controlling software has normally completed. The start controlling means can start the rewriting firmware, provided that the memory content of the rewriting-state identifying information storage part is set to the under-rewriting state. With these means for doing such processing, a fact that the memory content of the rewriting-state identifying information storage part remains to be the under-rewriting state implies that the last rewrite processing failed halfway. Therefore, by starting the rewriting firmware immediately, shift to the repair processing can be done quickly.

The rewriting firmware can be configured to acquire an update version program of the function controlling software to be used for rewriting from a data sender apparatus connected to the control system by communication and performing rewriting with it. In this case, identifying information rewriting means can be configured to maintain the memory content of the rewriting-state identifying information storage part at the under-rewriting state by receiving an instruction of maintaining a state of rewriting received from the data sender apparatus. According to this method, it becomes possible to grasp more surely a state of transfer and writing of the update version program by cooperating with a data sender apparatus, and reliability concerned with setting of the under-rewriting state is improved considerably.

In this case, identifying information rewriting means periodically receives an instruction of maintaining a state of rewriting during a period from the start of the rewrite processing of the function controlling software to its normal completion. When the identification rewriting means is configured to maintain the memory content of the rewriting-state identifying information storage part at the under-rewriting state, the above effect can be enhanced further. For example, provided that the rewriting firmware receives the update version program as divided into a plurality of blocks sequentially from the data sender apparatus, the identifying information rewriting means can be configured to receive an instruction of maintaining a state of rewriting for each block.

Next, the identifying information rewriting means can be configured to set the storage state of the rewriting-state identifying information storage part to the rewriting-normally-completed state when the rewriting firmware has written the whole of the update version program received from the data sender apparatus in the nonvolatile memory and has verified the update version program written based on verifying data received from the data sender apparatus. Since the rewriting-normally-completed state is set up after verification, this setting can improve reliability when the written update version program is being used. In this case, the identifying information rewriting means can be configured to, when the rewrite processing by the rewriting firmware has failed during the verification, set the memory content of the rewriting-state identifying information storage part to the under-rewriting state in such a way that makes it possible to specify that the rewrite processing failed during the verification. Corresponding to this, the start controlling means can be configured to restart the rewriting firmware so that the rewrite processing is resumed from the verification processing. With these configurations, regarding the failure in a stage of verification it is not necessary to go back to write processing of the update version program and only the verification processing needs to be conducted again, and consequently the re-rewrite processing can be simplified significantly.

Moreover, the identifying information rewriting means can be configured to, when the rewrite processing of the function controlling software in the nonvolatile memory of the rewriting firmware has failed halfway, set the memory content of the rewriting-state identifying information storage part to the under-rewriting state in such a way that an interruption location of the rewrite processing (in addition to the rewrite processing in the nonvolatile memory, the verification processing of written data is included) can be specified. In this case, the start controlling means can be configured to specify the interruption location from the memory content of the rewriting-state identifying information storage part and restart the rewrite processing from that interruption location. With these configurations, when the rewrite processing is interrupted halfway, the rewrite processing by the rewriting firmware can be resumed from the interruption location, and consequently the re-rewrite processing can be simplified considerably.

Although theoretically, resolution in specifying the above interruption location can be enhanced to a unit of bit constituting the update version program data, in this case, it is necessary to accompany each bit with rewriting-state identifying information, and accordingly a total size of the rewriting-state identifying information becomes extremely large. This leads to useless consumption of the memory. For example, in the case where the rewriting firmware receives the update version program as divided into a plurality of blocks (naturally, each consists of multiple bits) sequentially from the data sender apparatus, the identifying information rewriting means can be configured to, when the rewriting firmware has interrupted the rewrite processing of the function controlling software in the nonvolatile memory halfway, set the memory content of the rewriting-state identifying information storage part to the under-rewriting state in such a way that makes it possible to specify in which block the rewrite processing has been interrupted. In addition, the start controlling means can be configured to specify a block on which the processing is interrupted from the memory content of the rewriting-state identifying information storage part and restart the rewriting firmware so that the rewrite processing is resumed from that block. In this method, the rewriting-state identifying information only need be accompanied with each block, and enlargement of its total size can be prevented.

The multiple rewriting-state identifying information storage parts can be installed, each corresponding to each block of the update version program. The rewriting firmware can be configured to set storage states of the plurality of rewriting-state identifying information storage parts to the rewriting-normally-completed states sequentially on a first-completion first-setting basis. The rewriting-state identifying information storage part can be configured to restart the rewriting firmware in such a way that the rewrite processing is resumed from a block whose storage state of the rewriting-state identifying information storage part is not set to the rewriting-normally-completed state. With such configurations, it is possible to grasp quickly and properly to which block the rewrite processing has normally completed by sequentially checking the contents of the rewriting-state identifying information storage parts of the blocks whose rewriting order has been fixed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
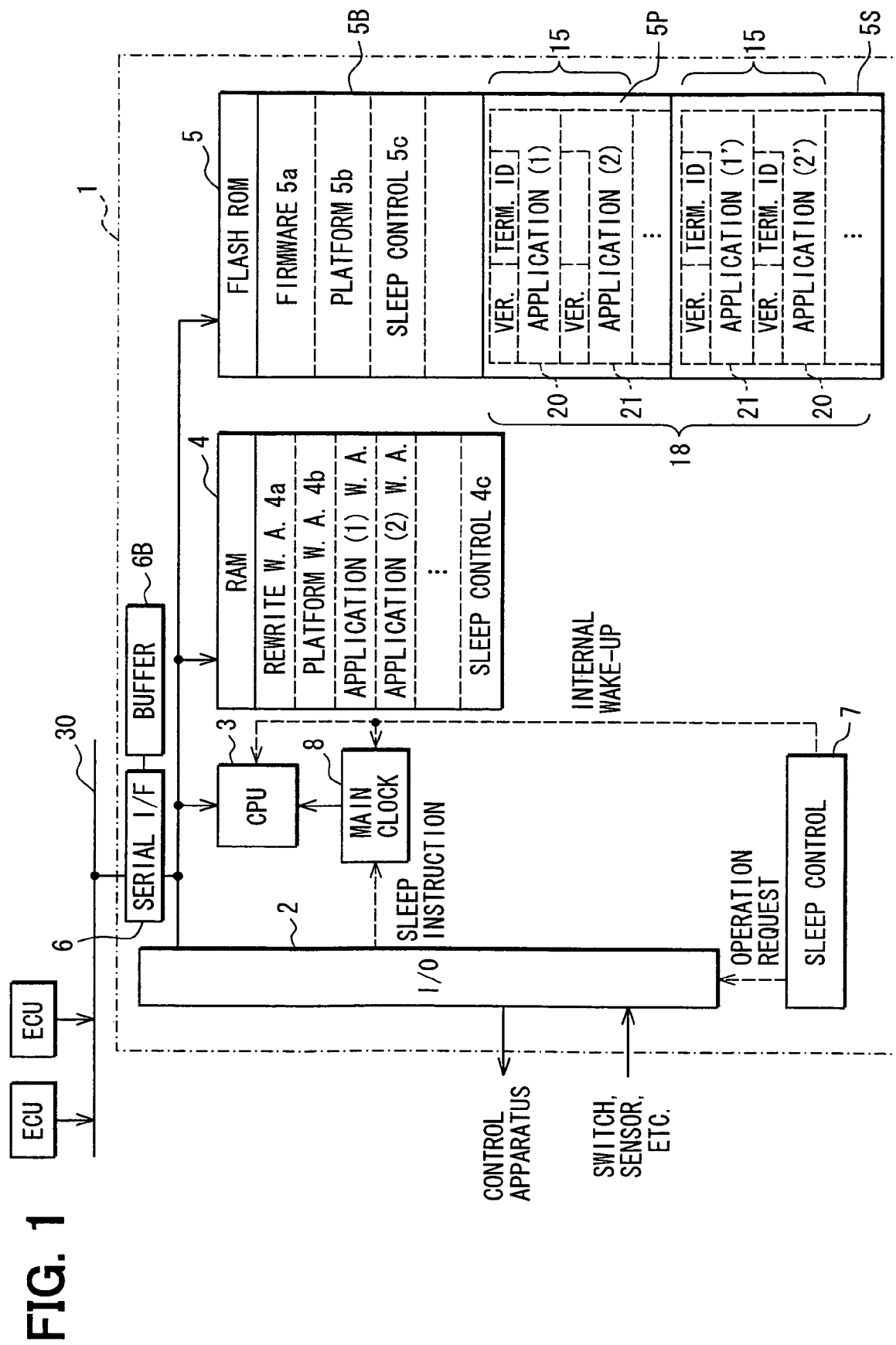
FIG. 1 is a block diagram showing a first embodiment of an ECU configured as an electronic control system for an automobile of the present invention.

Referring to FIG. 1 showing an electrical configuration an electronic control unit (ECU) of an electronic control system for an automobile, an ECU 1 has a main control unit made up of a CPU 3 and performs control processing of electronic apparatuses mounted on an automobile as control target apparatuses to be controlled based on execution of a predetermined application program (control software) 18. The main control unit is further made up of a ROM 5, a RAM 4, and a microprocessor to which an input/output unit (I/O port) 2 are bus-connected. The ECU 1 is constructed as a body (chassis) system ECU for handling a control of a body system of an automobile in this embodiment. Each of application programs 18 operates on a platform 5b, and an individual work area therefor is ensured in the RAM 4. The platform 5b is for providing an operation environment common to the application programs even when pieces of hardware serving as bases differ from one another, and is constructed with an interface program for linking the application program and hardware etc. as well as an operating system (OS) for the application program, which is a conceptually well known part and details of its explanation will be omitted.

Each application program realizes a body system function that is a function concerned with an operation of several parts of a vehicle by a vehicle user. The body system functions include, specifically, a control associated with door open and close, a control associated with window open and close, a control associated with turning on/off of light switches, a control of a wireless door locking adopted for a keyless entry system etc. Specifically, the following can be exemplified:

Locking/unlocking and a power window operation of a driver side door, a passenger side door, a rear right-hand side door, a rear left-hand side door, a roof, etc., and the like Operations of power supplies of an air-conditioner, a car audio, a car navigation system, etc.

Controls of turning-on of switches of a room lamp, a cockpit lamp, headlights, small lamps, hazard lamps, tail lamps, etc.

The ECU 1 handles controlling operations of various control target apparatuses of the body system (devices to be controlled) through execution of the application programs while referring to input signals of switches and sensors from the outside as needed. Moreover, the ECU 1 proceeds to a sleep mode under some conditions, such as when the vehicle is in a parking state, or when there is no operation of the switches. Specifically, this transition to the sleep mode is done by making the whole ECU 1 proceed to a low power consumption mode. In the embodiment, a stand-by mode where a main clock circuit 8 for operating clock for the CPU 3 is halted, when operations of all the application programs have terminated and are in waiting modes for starting next operations. Its control is assumed by sleep control software 5c.

Figure 3:
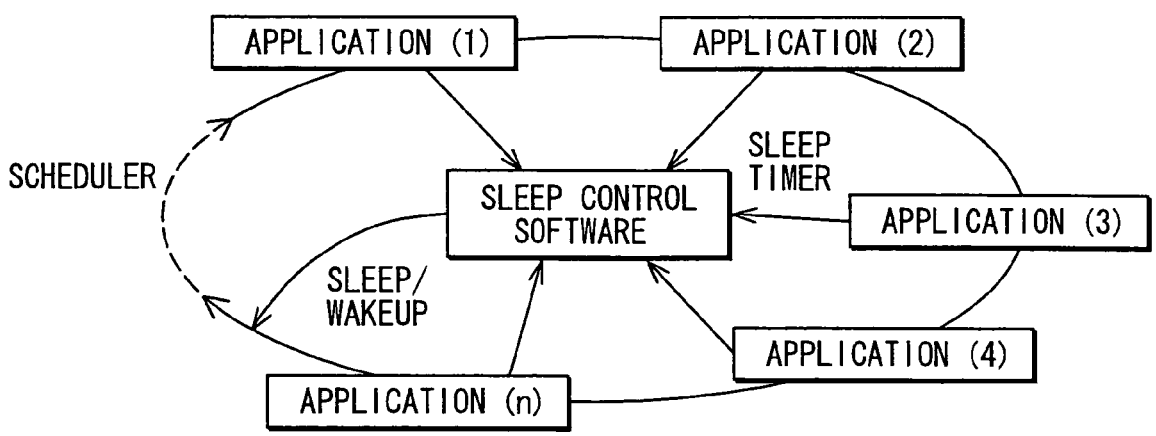
FIG. 3 is a schematic diagram of a scheduler.

As shown in FIG. 3, the scheduler formed as a part of functions of the platform (acting as a part of functions of the control-software start control) starts and controls a plurality of application programs (1), (2), ..., (n) periodically in the predetermined time series order. When the execution task of a certain application program comes and a request of operation to a corresponding function is inputted from the outside, that application program will be started. When the request of operation is not inputted, the execution task of the application program will be skipped. Then, when a certain time elapses with no operation request for a corresponding function being inputted, each application program becomes able to proceed to the above sleep state. Here, description of "able to proceed to" is given because it is impossible to make the whole of the CPU 3 proceed to a sleep mode when there is an input of an operation request to a function that other application program bears.

Moreover, although the CPU 3 that has temporarily shifted to the sleep mode will wake-up by receiving an outside start request to any of the application programs as an external wake-up signal, there also exist start request signals whose inputs cannot be recognized when the CPU 3 is waked up at least temporarily. When it is required to start a specific application program using such an input as a trigger, processing that a corresponding application program is waked up at a constant time periodically even in the case of being in a sleep state and is made to proceed to a sleep state again when there is not the above received input etc. becomes necessary. That is, what is necessary is processing whereby the CPU 3 is made to proceed to a sleep mode when there is no outside operation request to any of the plurality of application programs and subsequently repeat sleep/wake-up periods consisting of a constant sleep period and a constant wake-up period in which the CPU 3 is waked up into a normal mode to check the presence of an outside operation request (internal wake-up processing). This function is implemented by the sleep control software 5c and a sleep control circuit 7 configured as hardware independent from the CPU 3.

Regarding the internal wake-up processing, requested wake-up periods generally differ depending on each application program, and timing in which an application program shifts to a sleep mode again after being waked up by an external wake-up signal also differs. The sleep control software 5c has a timer routine, grasps reception timings of outside start request signals for the application programs. When inputs of start request signals for all the application programs cease, the sleep control software 5c determines that the control unit has entered a common operation rest period. Then, the sleep control software 5c also grasps wake-up periods requested from the application programs collectively, and finds a shortest wake-up period. When a predetermined time elapses after entering the above common operation rest period, the sleep control software 5c sets up the found wake-up period in the sleep timer provided in the sleep control circuit 7, halts an operation of a main clock circuit 8, and makes the CPU 3 sleep (FIG. 3).

Since the CPU 3 that is once made to sleep halts operations as an operation circuit, it cannot conduct the wake-up processing by itself. Then, when the wake-up period being set in the sleep timer has elapsed, the sleep control circuit 7 starts the main clock circuit 8 by sending a start signal (internal wake-up signal) to it to resume the operation of the CPU 3. It becomes easy to understand these operations by imaging a situation where one falls in a sleep after setting a wake-up clock (sleep timer) in the sleep control circuit 7 by oneself. When the time comes, the wake-up clock wakes the operator. Then, an interruption start signal (internal wake-up signal) is also sent to the CPU 3. Receiving this, the CPU 3 conducts resource setting processing for wake-up by the predetermined interruption processing and the like and wakes up.

Figure 2:
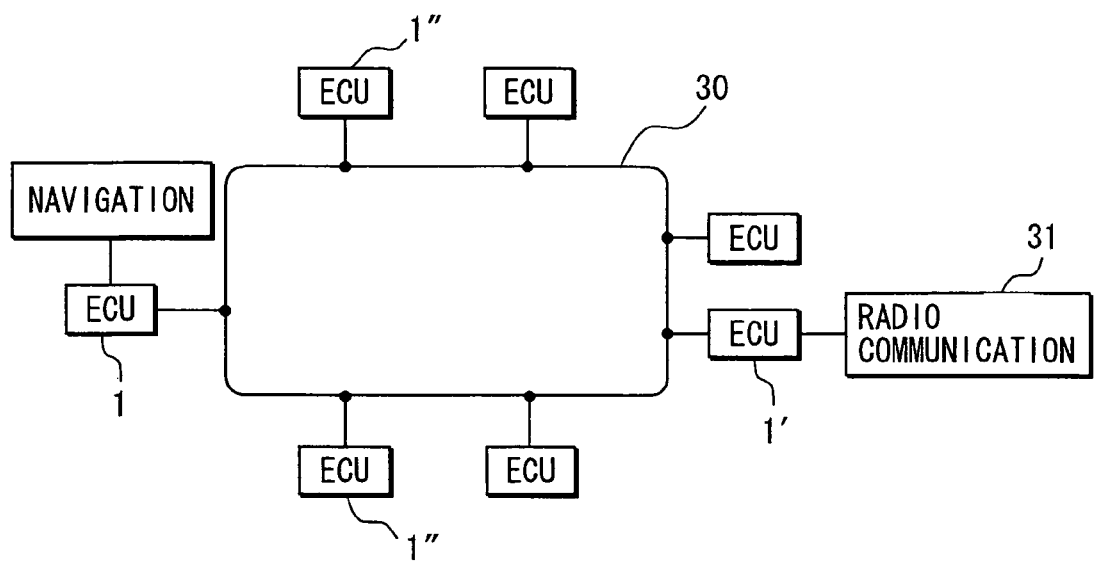
FIG. 2 is a schematic diagram illustrating an in-vehicle network where a plurality of ECUs is connected together.

Next, the ECU 1 is, as shown in FIG. 2, connected with other ECUs 1', 1", etc. through a serial communication bus 30. As shown in FIG. 1, the serial communication bus 30 is connected with internal buses of the ECUs through a serial communication interface 6. The serial communication enables the ECU 1 to receive, for example, data for determining a reset instruction or a wake-up factor and data about version-up of the application program (control software), i.e., data of an update version program. A receiver buffer 6b is provided for storing the received data temporarily.

The ROM 5 in which the application program 18 is stored allows storage contents to be electrically rewritten, and is made up of a nonvolatile memory, in this embodiment a flash ROM (flash memory), that retains the storage contents even when receiving an outside reset signal. This ROM 5 is hereinafter also referred to as a flash ROM. In the flash ROM 5, a drive voltage at the time of reading and a drive voltage at the time of writing and erasing are different; the latter (for example 9V) is set higher than the former (for example 5V; the reset signal is an edge trigger signal of the same level). That is, since the signal voltage of writing/erasing is controlled with a voltage higher than the reset signal, even when receiving the reset signal, the storage contents of the flash ROM 5 are retained. A storage area of the flash ROM 5 is divided into a plurality of rewriting unit blocks 15. Erasing, writing and rewriting of the storage contests can be conducted on a basis of rewriting unit block 15. Although FIG. 1 renders a situation where two application programs are stored in one of the rewriting unit blocks 15, the number of the unit blocks 15 may change depending on the size of an application program. In the case of an application program of an especially large size, the application program may be stored over two or more rewriting unit blocks. In this embodiment, the flash ROM 5 is made up of a single memory chip, which is partitioned into a first (primary) memory 5P and a second memory 5S each of which is designed to be a fixed memory consisting of a group of individual rewriting unit blocks.

Moreover, the flash ROM 5 stores rewriting tool (firmware) 5a as firmware for updating application program control software. In the ECU 1 that will be a destination of application program updating, the flash ROM 5 has a formation of a main storage area 20 for storing the current version program that is a currently used version program of the application program (control software) and a formation of a sub-storage area 21 for storing an update version program that includes updated points to be updated from the current version program. The rewriting firmware 5a is firmware (reprogram processing) for executing program rewrite processing. This processing includes: program store processing that stores an update version program acquired from the outside in the sub-storage area 21; and memory changeover processing that, when storing of the update version program has ended successfully in the sub-storage area 21, changes over the sub-storage area 21 to a new main storage area as the main storage area 20 instead of a memory area currently being used and, when the writing in the sub-storage area 21 has failed, does not conduct the changeover. When the writing of the update version program in the sub-storage area 21 has been done successfully, the rewriting firmware 5a along with both the platform 5b and the sleep control software 5c are stored in a base memory 5B that is different from the first memory 5P and the second memory 5S serving as storage destinations of a group of application programs. The CPU 3 is programmed to, when acquiring an update version program, perform program rewrite processing by the rewriting firmware 5a independently from execution processing of the current version program.

In FIG. 1, reference numerals or symbols tagged with "'," such as application program 1', application program 2', . . . , represent update version programs, and reference numerals or symbols not tagged with "'" represent the current version program, wherein application programs having the same reference numerals or symbols are the same application program, but of different versions. The program processing by the rewriting firmware is executed in such a way that each time an update version program is newly acquired, the sub-storage area is formed in either the first memory 5P or the second memory 5S alternately.

The first memory 5P and the second memory 5S store programs of a plurality of application programs each having different function, respectively. The main storage area 20 and the sub-storage area 21 for the same application program are formed in the first memory 5P for one of them and in the second memory 5S for the other. Since the two pieces of the memory are different, it is evident that the main storage area 20 and the sub-storage area 21 for the same application program are formed in mutually different rewriting unit blocks. Specifically, each time program updating occurs in an individual application program, the rewriting firmware 5a determines independently in which of the memories 5P and 5S the main storage area 20 and the sub-storage area 21 of that application program are formed. Consequently, the main storage areas 20 and the sub-storage areas 21 for different application programs are formed mixedly in the first memory 5P and in the second memory 5S, depending on the number of updating of each application program. That is, when the sub-storage areas for two application programs, application program 1 and application program 2, are formed in different memories, it is because that the number of version-up (updating) is different between the two application programs.

Moreover, the firmware 5a writes the update version program in the sub-storage area 21 along with version information specifying the version (Ver.). The firmware 5a writes a normal termination ID (term. ID) in response to the normal termination of the update version program along with version information. Regarding the application program 1, the version information and the normal termination ID are written for the current version program in the main storage area 20. This is because the main storage area 20 was used as the sub-storage area at the time of the last updating, and the version information and the normal termination ID were written in that time. On the other hand, regarding the application program 2, the normal termination ID is not given to the update version program in the sub-storage area 21. This implies that writing of the update version program has failed according to a factor, such as communication failure.

Hereafter, the electronic control system of an automobile will be described in detail taking as an example a case where the control target apparatus in FIG. 1 is a car navigation system and a function control application program of the car navigation is updated for version-up. It is not however intended to limit the present invention to this example. In FIG. 2, it is assumed that an update version program of an application program used by the ECU 1 is received by a wireless or radio communication unit 31 connected to the ECU 1'. Reception of this update version program can be conducted in various forms. For example, in the case where a delivery time of the update version program from the server is fixed as a regular version-up and the ECU 1' sends an update version program unilaterally just at that time, it is just necessary for the radio communication unit 31 to autonomously receive the update version program.

Moreover, in the case where an update version program is downloaded and acquired by the user's request, it is also possible to adopt a method in which the radio communication unit 31 sends by radio a delivery request of the update version program to the server, and the radio communication unit 31 receives an update version program sent by the server in response to this. Alternatively, a system where the user sends by radio a distribution request from a portable phone terminal, an update version program is received with the portable phone terminal, and subsequently it is transferred to the radio communication unit 31 by a near field radio communication technology, such as Blue Tooth, may be adopted. In any case, the received update version program is downloaded in a fixed storage unit (for example, flash ROM) in the ECU 1'. In FIG. 2, the ECU 1' informs the ECU 1 of reception of an update version program through the serial communication bus 30.

Figure 4:
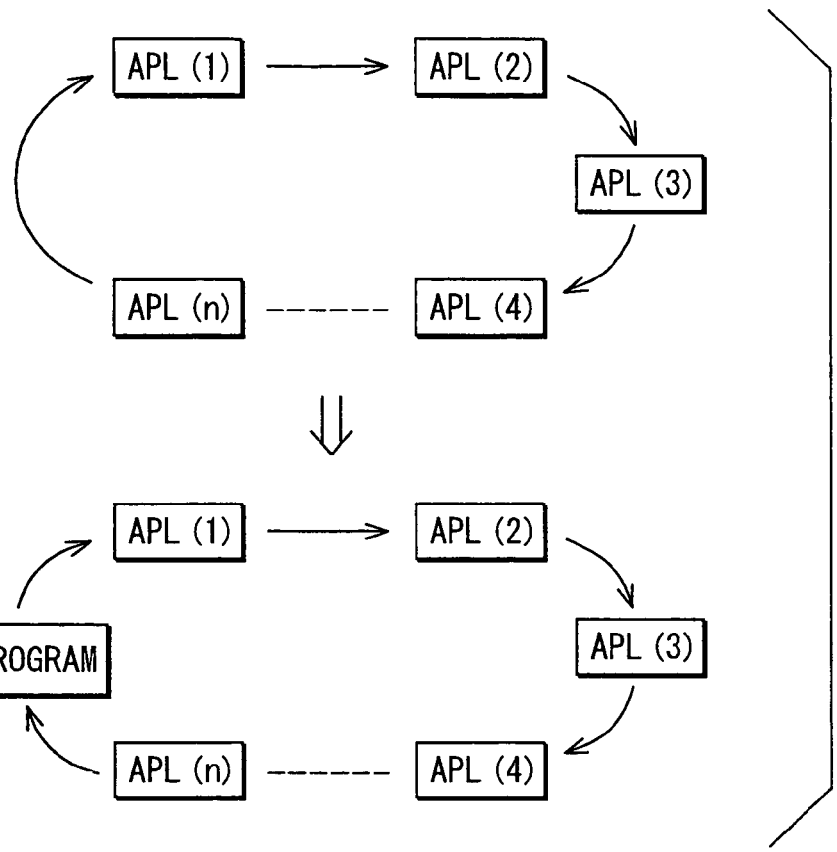
FIG. 4 is a schematic diagram illustrating executing reprogram processing by incorporating it into a task array by the scheduler.
Figure 5:
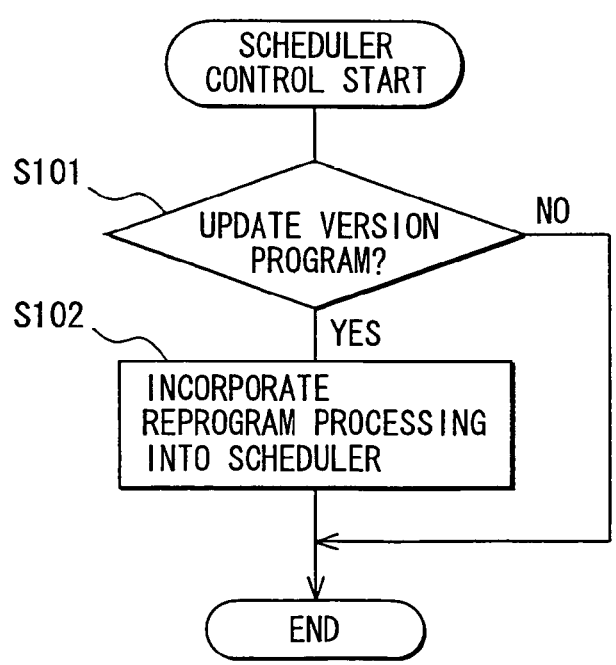
FIG. 5 is a flowchart showing one example of scheduler control processing.

As shown in FIG. 4, when performing the above reprogram processing, a task of the above reprogram processing is incorporated in an execution array of a plurality of application programs in the scheduler. FIG. 5 shows a flowchart concerned with control processing of the scheduler. When a notice of an update version program is received at step S101, the processing proceeds to step S102, where a task of reprogram processing by the rewriting firmware is incorporated in the scheduler. By this, the reprogram processing will be performed in parallel in the background of each application program.

Figure 6:
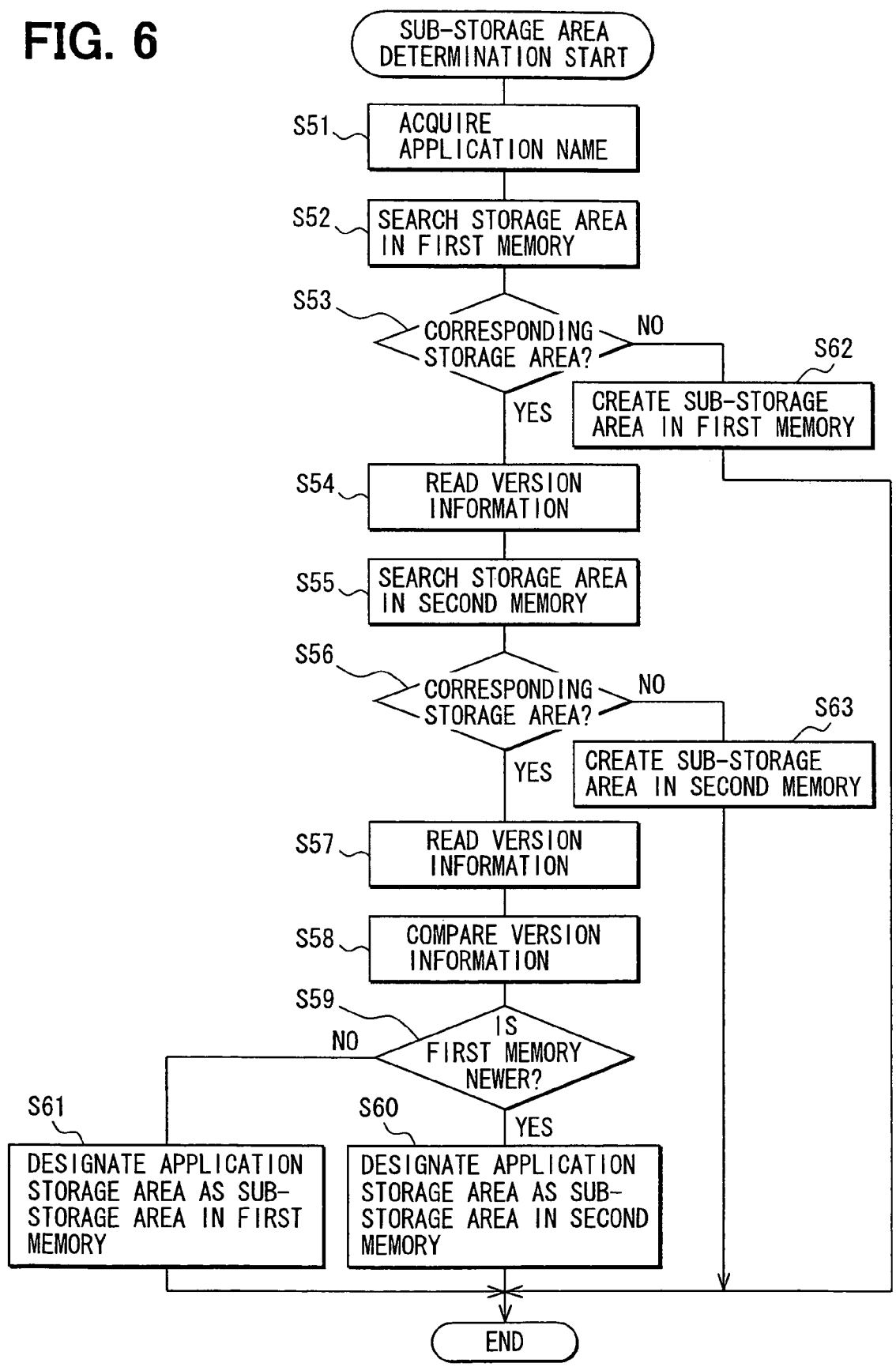
FIG. 6 is a flowchart showing one example of sub-storage area determination processing.

FIG. 6 shows a flow of sub-storage area determination processing. First, at step S51, a name of an application program to be updated is acquired. At step S52, a storage area of the application program is searched in the first memory 5P. When there is the corresponding storage area of the application program at step S53, the processing proceeds to step S54, where version information written in the storage area is read. Next, at step S55, a storage area of the application program is searched in the second memory 5S. When there is the corresponding storage area of the application program at step S56, the processing proceeds to step S57, where version information written in the storage area is read.

Then at step S58, two pieces of version information read from both memories are compared, and it is determined which is the older version at step S59. When the first memory 5P is older, the storage area on the first memory 5P is designated as the sub-storage area (step S61); when the second memory 5S side is older, the storage area on the second memory 5S is designated as the sub-storage area (step S62). That is, designating a storage area where the older version program earlier than the current version program is stored as the sub-storage area where the latest update version program will be stored, processing of overwriting the update version program there is conducted.

It is noted that when application programs are not stored in the first memory 5P and in the second memory 5S correspondingly at steps S53 and S54, it implies that the application program has been installed for one version at the highest, and accordingly the sub-storage area that will serve as a storage destination of the update version program will be newly created in the memory where the application program is not stored (steps S62 and S63).

Figure 7A:
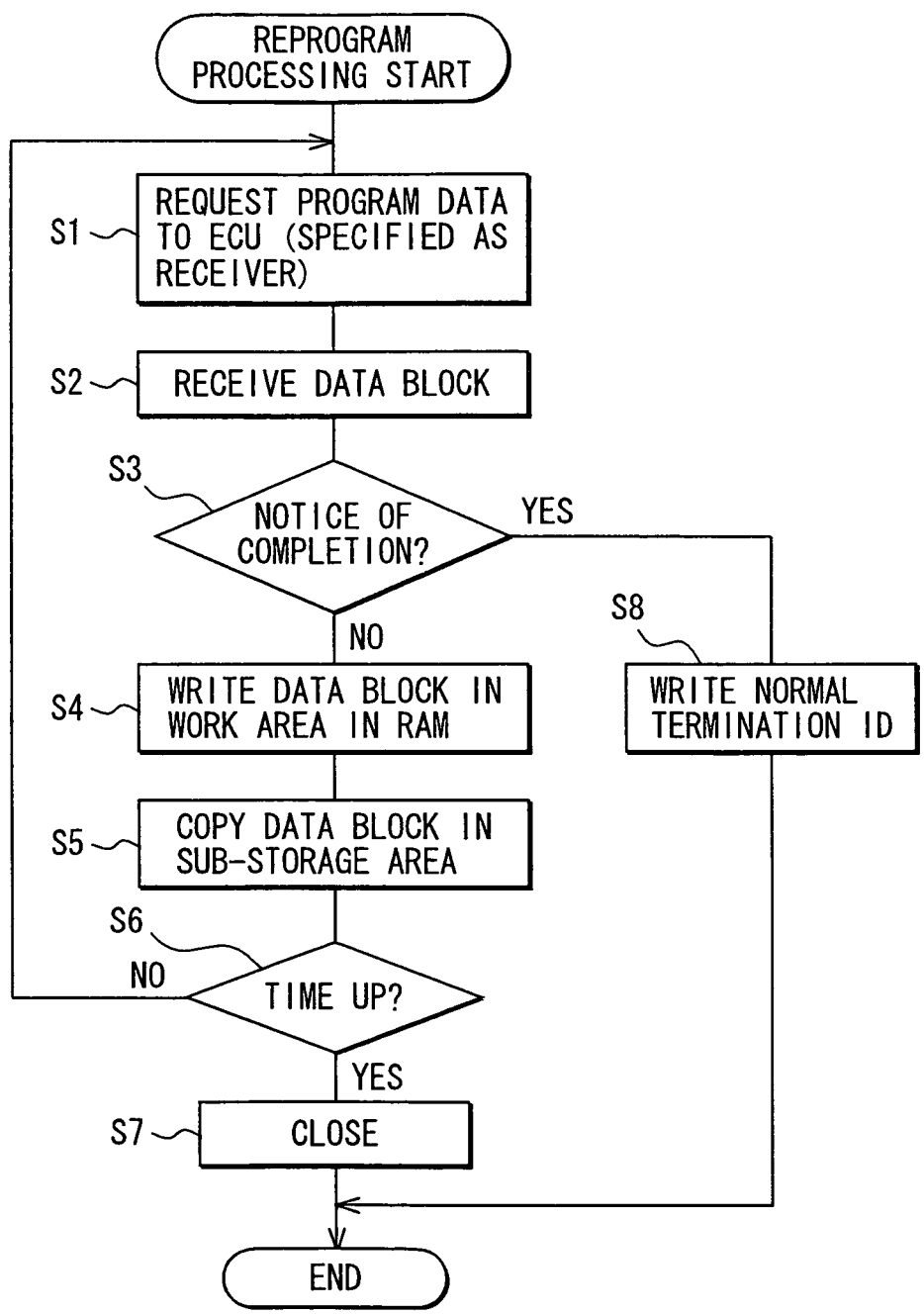
FIG. 7A is a flowchart showing a first example of reprogram processing.

Next, FIG. 7A is a flowchart showing the processing of reprogram processing. At step S1, a request to send of program data is sent to the ECU 1' that is specified as a receiver of an update version program. Receiving this, the ECU 1' creates data frames by dividing the update version program into fixed blocks and sends out these frames in the serial communication bus 30. The ECU 1 receives the data block at step S2. When transmission of the whole of one program has ended, the ECU 1' sends a notice of program transmission completion, the ECU 1 checks this at step S3.

When there is no notice of the program transmission completion, the processing proceeds to step S4, where the ECU 1 stores the received data blocks temporarily in a work area 4a for program rewriting formed in the RAM 4 of FIG. 1. Then, the data blocks that were buffered are written or copied in the sub-storage area 21 of the flash ROM. At step S6, when an allocation time for one period of the reprogram processing by the scheduler has not elapsed, the processing returns to step S1 to receive and write the next data block and repeats the subsequent steps of the processing. On the other hand, when it is expected that the allocation time times over in the next period, the processing proceeds to step S7, where in order to terminate writing processing of the update version program halfway, a file that is being written in the sub-storage area 21 of the flash ROM is closed temporarily.

Then, as shown in a lower part in FIG. 4, when the task of reprogram processing comes again in the next period of the application program start cycle by the scheduler, reception and writing processing of succeeding data block will be resumed. The scheduler always grasps whether the task of the reprogram processing comes by timer measurement. At the time of coming of the task, all the other application programs (control software) has halted to operate (in a start stand-by state). It is clear that the reprogram processing (program rewrite processing) is performed in the common operation rest period and that the scheduler has both a function of control software start controlling means and a function of common operation rest period specifying means for specifying a common operation rest period. Furthermore, when the reception and writing of the whole update version program has not ended in a single task of reprogram processing, the reprogram processing of FIG. 7 is repeated each time the execution period by the scheduler comes. Therefore, it is clear that the program processing is performed by time division processing that extends over two or more common operation rest periods coming successively in a sequential manner.

When receiving and writing a first data block, the version information of the target update version program is written in the sub-storage area, and at the same time normal termination ID has been reset (erased). When the reception and writing of all the data blocks have ended and the notice of program transmission completion is received at step S3, the processing proceeds to step S8, where the normal termination ID is written to terminate the reprogram processing. In response to this, the scheduler conducts processing of deleting a task of reprogram processing from an execution period. On the other hand, when the reception and writing of the update version program have failed halfway, the normal termination ID remains not being written. In FIG. 1, although the update version program is written in the sub-storage area 21 in the first memory 5P, the normal termination ID is missing because the reception and writing have failed.

Figure 8:
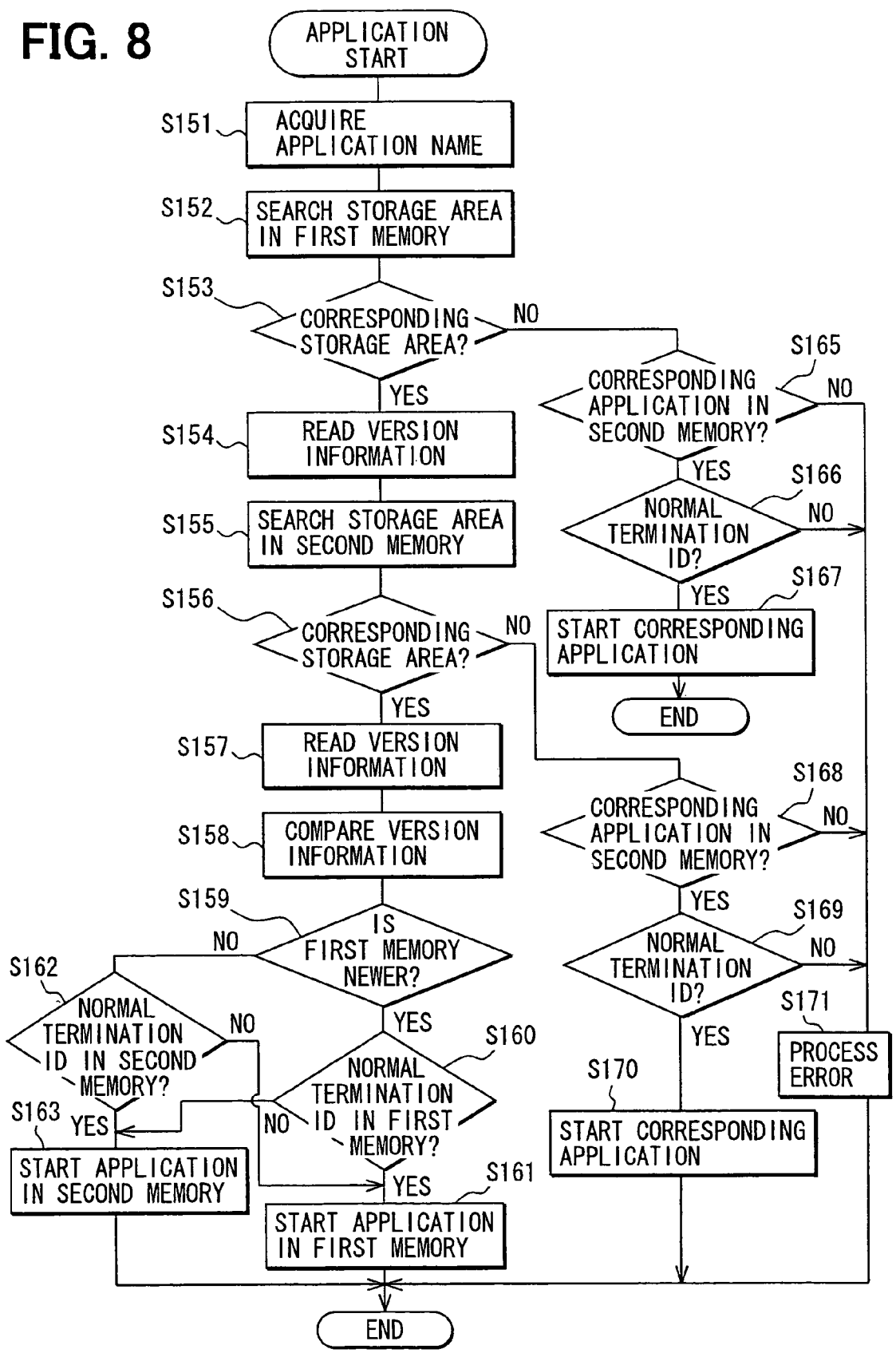
FIG. 8 is a flowchart showing one example of application program start processing.

FIG. 8 shows a flow of start processing of an application program after reprogram processing. At step S151, the name of an application program to be started is acquired. At step S152, a storage area of the application program is searched in the first memory 5P. At step S153, when there is a storage area corresponding to the application program, the processing proceeds to step S154, where version information written in the storage area is read. Next, at step S155, a storage area of the application program is searched in the second memory 5S. When there is a storage area corresponding to the application program, the processing proceeds to step S157, where version information written in the storage area is read.

Then, at step S158, two pieces of version information read from both memories are compared and it is determined which is the older version at step S159. When the first memory 5P is new, the processing proceeds to step S160, where it is determined whether there is a normal termination ID in the storage area of the first memory 5P. On the other hand, when the second memory 5S is new, the processing proceeds to step S162, where it is determined whether there is the normal termination ID in the storage area of the second memory 5S. In both cases, when there is the normal termination ID, the application program is started from the memory where the new version is stored (from step S160 to step S161 or from step S162 to step S163).

When there is not the normal termination ID, the application program is started from the memory where the previous version is stored (from step S160 to step S163 or from step S162 to step S161). It is clear that what is specified as a start destination of the application program is the above sub-storage area. At the moment when it is specified as a start destination and thereafter, the update version program is recognized as a current version program. Accordingly, while what was the sub-storage area until that moment is raised to be the main storage area, what was the main storage is demoted to the sub-storage area. In the next program update processing, this relation will be reversed again.

On the other hand, when at steps S153 and S156, either the first memory 5P or the second memory 5S does not store a corresponding version of the application program, it implies that only one version of the application program is stored in either memory, and accordingly the application program shall be started from that memory (step S16 step 7 S170). In any case, after checking whether the normal termination ID exists for the application program version installed solely (step S166, step S169), the processing is allowed to shift to start processing of the application program.

Although the above reprogram processing is performed by incorporating a task in an execution period of a plurality of application programs, the system is likely to suppress an operation of the application program because the schedule do time-sharing on the reprogram processing forcefully even when the application program is in operation. In view of this possibility, when the reprogram processing is tried to be executed so as to fall in a period when all the plurality of application programs do not have external operation requests, that is, when the CPU is allowed to shift to a sleep state normally, these anxieties can be eliminated. In this case, the common operation rest period shall be specified as the period when there are no external operation requests for all the application programs.

This embodiment takes as an example the case where the sleep mode consists of the first level sleep mode to which the normal mode can shift directly in a sequential manner and the second level sleep mode that is a sleep mode to which the first level sleep mode can shift after a predetermined time has elapsed and its power consumption is even smaller than that of the first level sleep mode. In this case, the sleep control software 5c of FIG. 1 is configured to make sleep setting by the first level sleep mode in the common operation rest period regardless of the acquisition of the update version program. When the update version program has been acquired, start the program rewrite processing instead of making the mode proceed to the second level sleep mode. In periods when the start request of each application program reduces in number extremely, for example, parking for a long time, it is often the case where the second level sleep mode is set up as described above. Entering the second level sleep mode may be referred to as entering deep sleep, etc. When the program rewrite processing is performed so as to fall in this period, butting against actual processing of the application program occurs hardly, and it becomes possible to rewrite a program of a large size at a time.

Figure 9A:
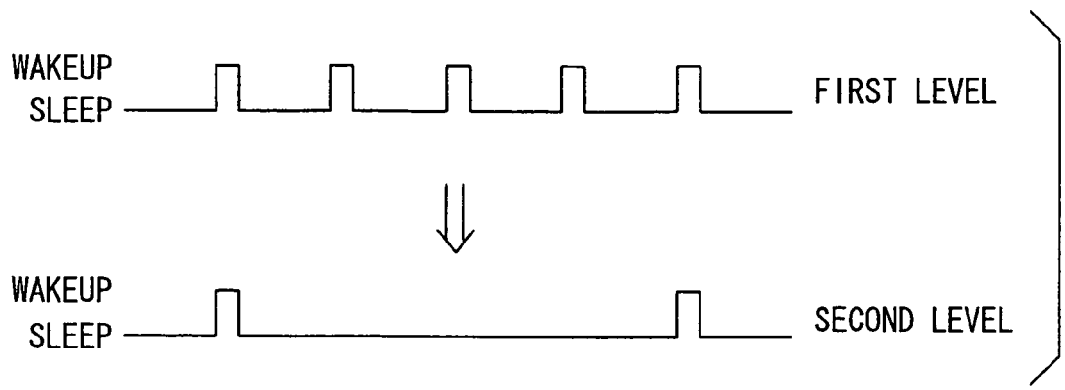
FIG. 9A is a timing chart showing one example of making sleep setting in a plurality of stages.

For example, in FIG. 1 the sleep control software 5c and the sleep control circuit 7 can be configured to have the following function (wake-up control). When there is no outside operation request to all of the plurality of application programs, the CPU 3 is made to proceed to the sleep mode, and subsequently repeats sleep/wake-up periods consisting of a fixed sleep period and a wake-up period in which the CPU is waked up to the normal mode for a fixed period in order that the CPU checks whether there is an outside operation request. In this case, as shown in FIG. 9A, the second level sleep mode is set in such a way that the length of its sleep period in the sleep/wake-up period is longer than that of the first level sleep mode.

Figure 9B:
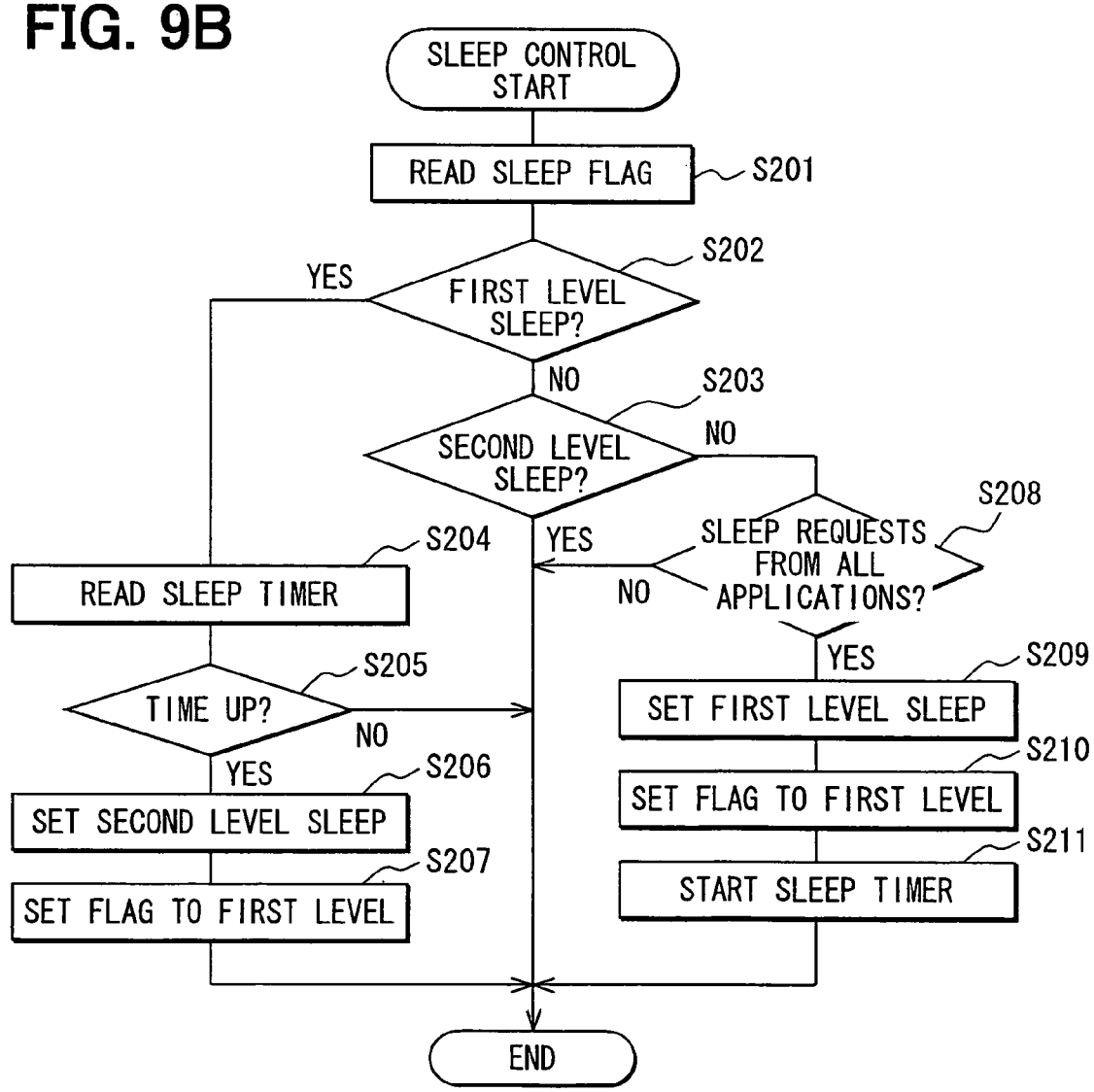
FIG. 9B is a flowchart showing one example of sleep control processing.

FIG. 9B shows a detailed example of the sleep control processing in this case. This processing is executable even in the sleep period by using the internal wake-up period that comes periodically. First, an unillustrated sleep flag is formed in the RAM 4 of FIG. 4. With a setup state of the sleep flag it can be identified whether the currently setup mode is the first level sleep mode or the second level sleep mode. At step S201 in FIG. 9B, this sleep flag is read to determine which level sleep mode is set up at step S202 and step S203. First, in a timing immediately after the wake-up by the outside start instruction, the sleep setting itself is not made, and then the processing proceeds to step S208 from step S203, where it is checked whether there are sleep requests from any of all the application programs. When there are sleep requests, the setting of the first level sleep mode (a sleep time corresponding to the first level sleep mode is set up in the sleep timer in the sleep control circuit 7) is made at step S209, and the sleep flag is changed to a corresponding state at step S210, and the sleep timer is started at step S211.

On the other hand, when the sleep flag indicates the first level sleep setting at step S202, the processing proceeds to step S204, where the sleep timer is read. When the read time exceeds or times up a specified time to proceed to the second level sleep mode at step S205, the processing proceeds to step S206, where the second level sleep setting is made. Then at step S207, the sleep flag is rewritten to the corresponding contents. Moreover, when at step S202 the sleep flag does not have the first level sleep setting, the processing proceeds to step S203. When the sleep flag has the second level sleep setting, the processing cycle is terminated.

Figure 7B:
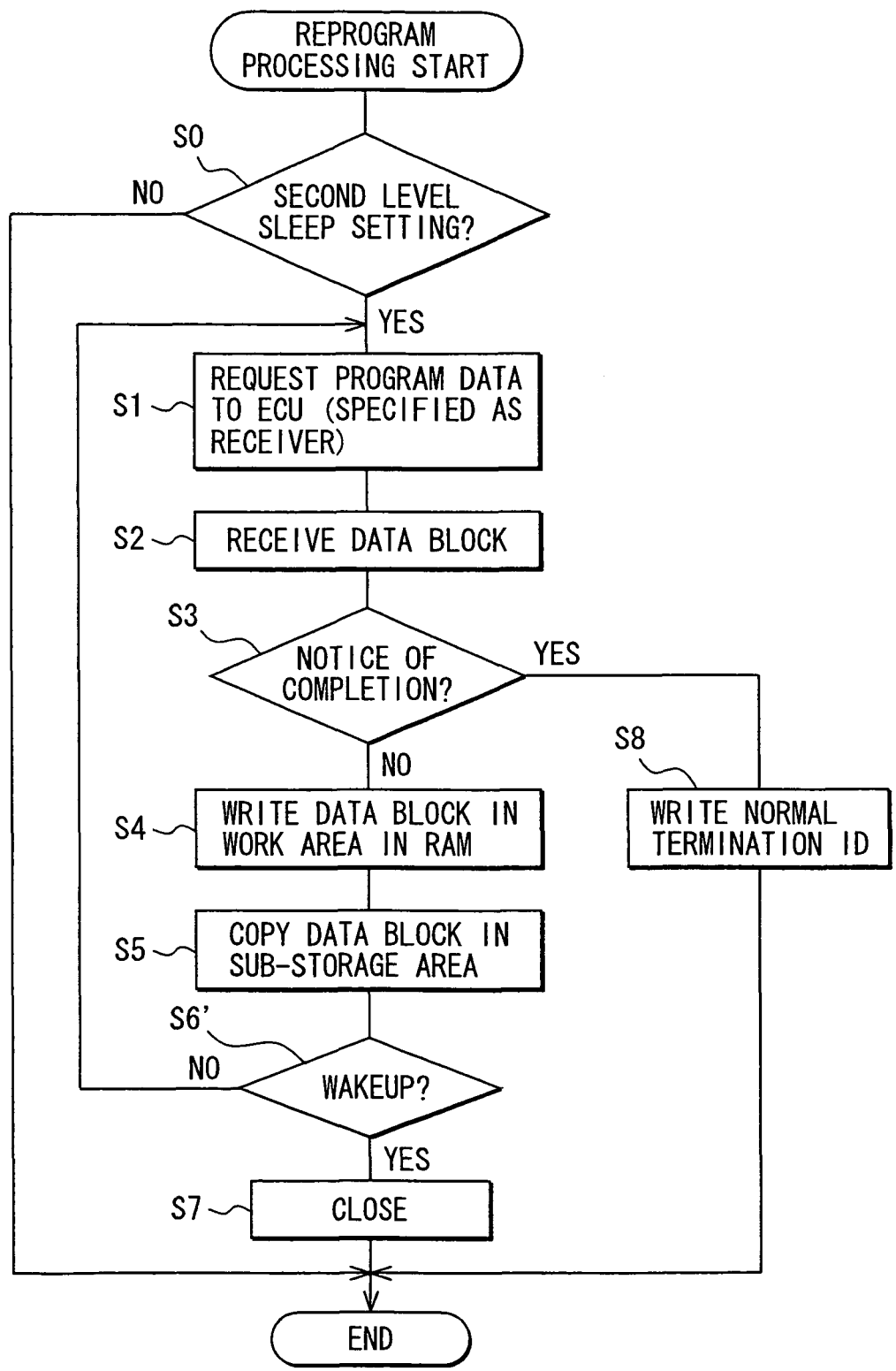
FIG. 7B is a flowchart showing a second example of reprogram processing.

FIG. 7B shows reprogram processing in this case. At step S0, the sleep flag is read, when it has the second level sleep setting, reprogram processing at step S7 and the subsequent steps as with FIG. 7A is executed. In this case, the processing will be executed at the time of wake-up in the second level sleep setting. At step S6', the processing checks whether there is an outside wake-up instruction. When there is no wake-up instruction, the processing returns to step S1, where the reprogram processing is continued. On the other hand, when the wake-up instruction is received, the processing proceeds to step S7 in order to give precedence to this processing and do close processing temporarily. It is when the second sleep level is set up again next that the reprogram processing is resumed.

(Second Embodiment)

Figure 10A:
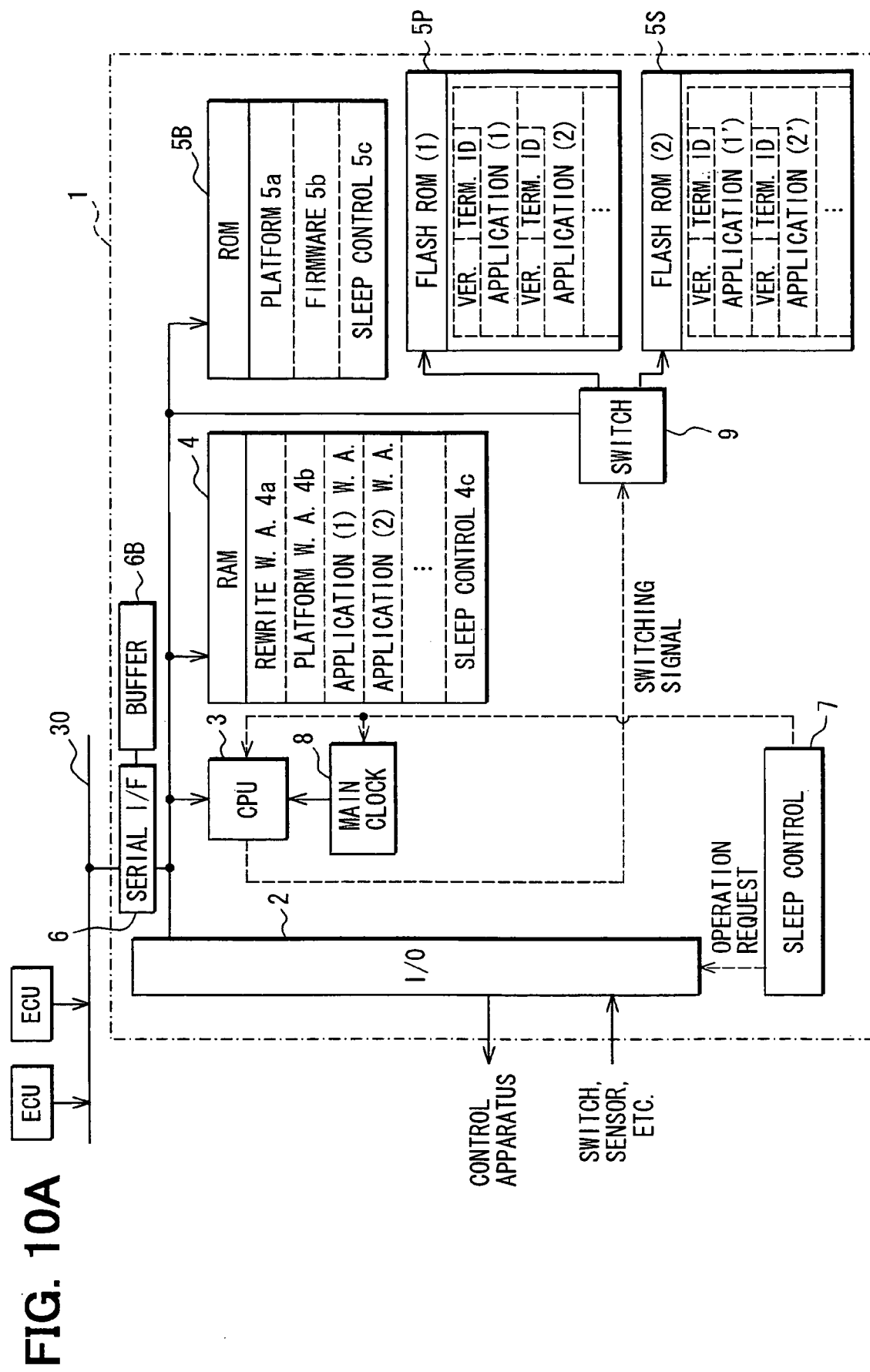
FIG. 10A is a block diagram showing a second embodiment of an ECU configured as an electronic control system for an automobile of the present invention.

As a second embodiment, the same address space in the nonvolatile memory may be used by the first memory 5P and the second memory 5S in such a way that the memory space is shared by switching over their connection to the bus. In this case, the memory on the sub-storage area side is connected to the bus, and rewrite processing of the update version program is performed. In this case, as shown in FIG. 10A, two flash ROM's (nonvolatile memories) each of which is designed as an independent memory chip are provided and made to function individually as the first memory 5P or the second memory 5S, respectively, either of which is selectively connected to the bus by the switch 9.

When the rewrite processing has normally ended, what is necessary is just to use the update version program in the memory connected to the bus for execution as the current version program (as a result, the sub-storage area has been changed over to the main storage area). At this time, since the memory having been functioning as the main storage area at that time is kept disconnected, the CPU 3 cannot see the memory; therefore, it will never occur in terms of hardware that the old version program in the memory would be executed despite the success of the update processing.

On the contrary, when the writing procession has not normally ended (or it was stopped halfway because of time division processing or the like), what is necessary is just to switch over the memory connected to the bus to the main storage area side memory, and put the current version program before updating into practical use (that is, the previous main storage area is used as it is and the changeover is not conducted). At this time, the memory having been functioning as the sub-storage area side is disconnected from the bus, and accordingly it will never occur that an incomplete update version program whose writing failed is executed. According to this system, it is not necessarily essential to write the version information and normal termination information described above.

However, in the above system, concerning the memory connected with the bus among the first memory 5P and the second memory 5S, all the programs stored therein need to be current version programs (that is, formed storage areas all become the main storage areas). In this case, when an update version program of a certain program is written in either the first memory 5P or the second memory 5S, processing in which the storage contents of the memory along with remaining application programs are copied to the other memory as a whole becomes necessary. By this procedure, it is possible to save the newest versions of non-updated application programs in the memory that becomes the main storage area by memory changeover at the time of that memory changeover accompanied with the next updating.

In FIG. 10A, application programs are stored in the ROM 5B that is different from ROM for the platform 5b, the rewriting firmware 5a, and the sleep control software 5c. This ROM 5B either may be made up of mask ROM or be made up of flash ROM.

Figure 10B:
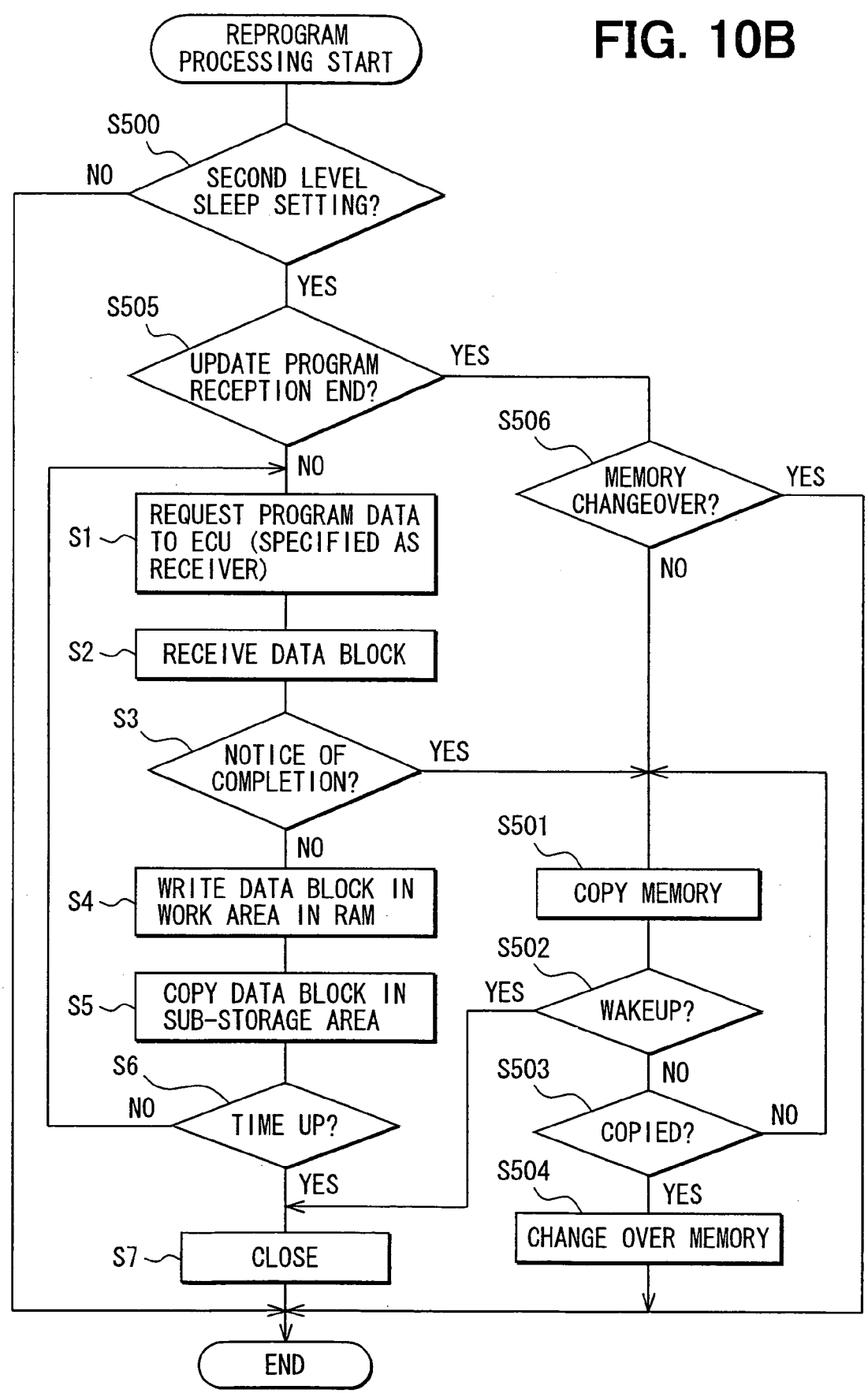
FIG. 10B is a flowchart showing an example of reprogram processing in the second embodiment.

FIG. 10B shows one example of reprogram processing in this case. Since it will take some time to conduct memory copy processing after memory changeover, reprogram processing that uses a time of sleep as with FIG. 7B is adopted. At step S500 that is the top of processing, the contents of setting of the sleep flag are read and checked as to whether the second level sleep setting is made. At step S505, it is checked whether the reception of an update version program has ended. When the reception has not ended, processing at step S1 to step S7 as with FIG. 7 is performed. Here, when at step S5, a notice of program transmission completion is received, the processing proceeds to step S501, where the contents of the memory having been used as the sub-storage area are copied in the memory having been used as the main storage area (memory copy processing). This copy processing is executable by repeating the following procedure: the sub-storage area side memory is connected to the bus; the contents are copied in the RAM 4; the main storage area side memory is connected to the bus; and the contents of the RAM 4 are written in the main storage area side memory.

When the wake-up signal interrupts halfway from the outside, the processing proceeds to step S7, where close processing is conduced temporarily. Then when the second level sleep setting is able to be checked (step S500), it now means "reception completion" and the processing proceeds to step S506 from step S505. When the memory changeover has not been done, the processing proceeds to step S501, where the memory copy processing will be continued. When the copy completion is checked at step S503, the processing proceeds to step S504, where a changeover signal is sent to the switch 9 (FIG. 10A) and the memory having been used as the sub-storage area is connected to the bus. At the same time, the memory changeover processing to disconnect the memory having been used as the main storage area from the bus is conducted. It is noted that when the reprogram processing has ended and a next update version program is not received, the processing proceeds as step S505, step S506 and then end, and processing concerned with the reprogram will not be performed at all.

(Third Embodiment)

Figure 11:
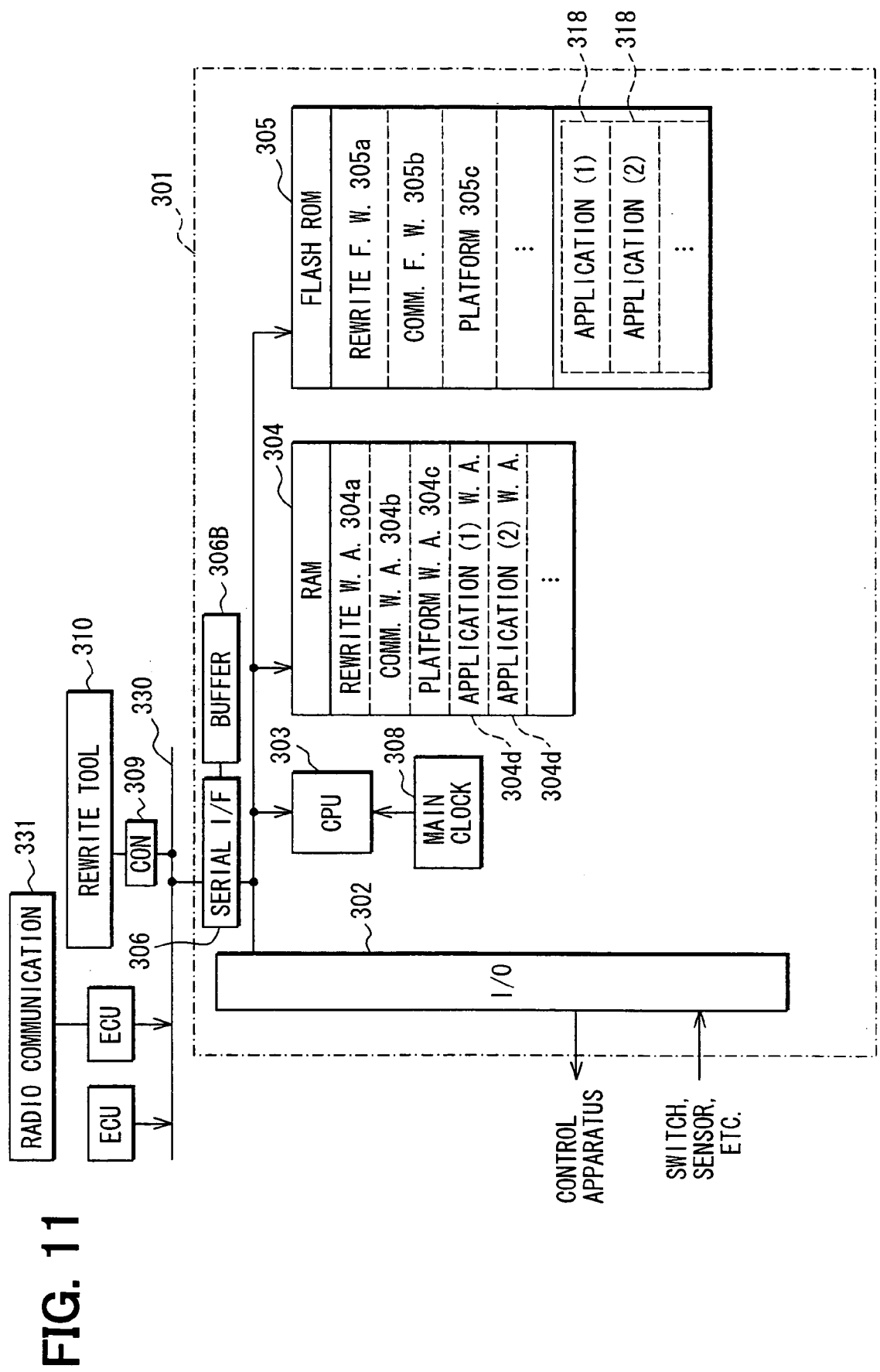
FIG. 11 is a block diagram showing a third embodiment of an electronic control system for an automobile of the present invention.

Referring to FIG. 11 showing a third embodiment, an ECU 301 has a main control unit made up of a CPU 303 and performs control processing of electronic apparatuses (control target apparatuses; devices to be controlled) mounted on an automobile based on execution of the predetermined application program (function controlling software) by the main control unit. Specifically the ECU 301 further has a ROM 305, a RAM 304, and a microprocessor to which I/O units (I/O ports) 302 are bus-connected. In this embodiment, the ECU 301 is constructed as a body system ECU that handles a control of a body (chassis) system of an automobile. Each application program 318 is stored in the ROM 305 and operates on a platform 305c stored similarly on the ROM 305, and an individual work area 304d is secured in the RAM 304. The platform 305c provides an operation environment common to each application program even when hardware serving as a base is different, and consists of an interface program that allows coordination between the application program and the hardware and the like as well as an operation system (OS) for the application program. In addition, a start controlling means is also incorporated in this platform 305c and run by the CPU 303 using the work area 304c in the RAM 304.

The application program realizes the body system functions that are functions concerned with operations on various parts of a vehicle conducted by the vehicle user. Specifically, the body system functions include a control associated with door opening/closing, a control associated with window opening/closing, a control associated with turning on/off light switches, a control of a wireless door lock mechanism adopted for a keyless entry system, etc. Specifically, the following can be exemplified:

Locking/unlocking of a driver side door, a passenger side door, rear right-hand door, a rear left-hand door, a roof, etc. and a power window operation thereof Power-source operation of an air-conditioner, a car audio, a car-navigation system, etc.

Controls of turning on a room lamp, a cockpit lamp, a headlight, a small lamp, and a hazard lamp, a tail lamp, etc.

The ECU 301 is connected with other ECUs through a serial communication bus 330, and the serial communication bus 330 is connected with an internal bus of each ECU through a serial communication interface 306. The communication firmware 305b handling processing of data transmission and reception through the serial communication bus is also stored in the ROM 305, and is put into execution by the CPU 303 using the work area 304b in the RAM 304.

The memory content of the ROM 305 in which the software is stored can be electrically rewritten, and the ROM 305 is constructed as a nonvolatile memory capable of maintaining the memory content even when receiving a reset signal from the outside. In this embodiment the ROM 305 is made up of a flash memory (flash ROM 305). In the flash ROM 305, the drive voltage in reading and the drive voltage in writing/erasing are different; the latter (for example, 9 V) is set higher than the former (for example, 5 V; the reset signal is an edge trigger signal of the same level). That is, since the control is done with the signal voltage of writing/erasing being higher than the voltage of the reset signal, the memory content of the flash ROM 305 is maintained even when receiving the reset signal. The memory area of the flash ROM 305 is partitioned into a plurality of rewriting unit blocks, which allows the memory content to be erased, written, and rewritten on a rewriting unit block basis.

Moreover, the flash ROM 305 stores rewriting firmware 305a for rewriting the contents of the application program stored in the flash ROM 305 (this storage area is a rewriting firmware storage part). The rewriting firmware 305a performs rewrite processing by acquiring data of the update version program of the application program that is a target of rewriting (version-up) and writing it in the flash ROM 305 by the above unit block using a rewriting work area of the RAM 304 as a buffer area. The data sender apparatus is, for example, a program rewriting tool 310 connected to the serial communication bus 330 through a connector 309. This program rewriting tool 310 is configured as a computer terminal having the fixed storage for storing data of an update version program of the application program. The data sender apparatus may be another ECU that receives the update version program data from an external radio communication network with a radio communication unit 331.

Figures 12, 13:
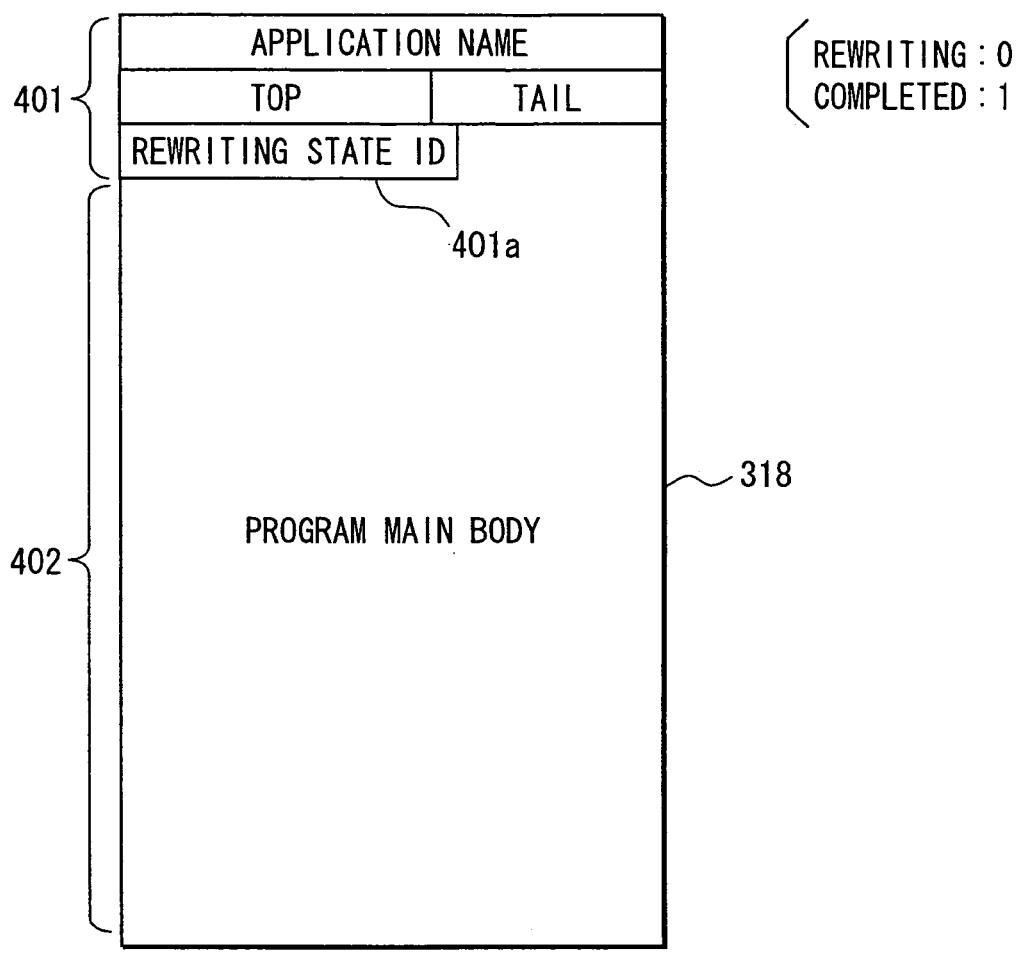
FIG. 12 is a schematic diagram illustrating an application program storage area of a flash ROM.
FIG. 13 is an explanatory diagram showing another setting example of an identifying ID.

As shown in FIG. 12 showing the storage area of the application program 318 in the flash ROM 305, this area has a formation of a rewriting-state identifying ID storage part (rewriting-state identifying information storage part: hereinafter also referred to simply as "identifying ID storage part") 401a. This part 401a stores the under-rewriting state identifying ID (rewriting-state identifying information; hereinafter also referred to simply as "identifying ID") for identifying whether the rewrite processing of the application program 318 by the rewriting firmware 305a has normally completed. In this embodiment, a header 401 made up of a fixed address area is formed at the top of the storage area, and the program body storage part 402 is formed in the form that follows the header 401. The header 401 has a formation of storage parts for an application program name, a top address of the program main body, and a tail address thereof, and a formation of the identifying ID storage part 401a described above. The addresses of the identifying ID storage part 401a are also fixed.

Moreover, the ECU 301 is equipped with functions of the identifying information rewriting means that controls a progress state of the rewrite processing by the rewriting firmware 305a and rewrites the memory content of the identifying ID in the identifying ID storage part 401a according to the progress state in such a way that makes it possible to grasp whether the rewrite processing has normally completed. In this embodiment, the rewriting firmware 305a also has the functions of the identifying information rewriting means. However, this firmware may be a separate firmware different from the rewriting firmware 305a. Moreover, the ECU 301 has a function of the start controlling means of: when starting the application program 318, referring to the memory content of the identifying ID storage part 401a; when the memory content indicates normal completion of the rewrite processing, starting the application program; and when the memory content indicates faulty completion of the rewrite processing, restarting the rewriting firmware 305a instead of the application program 318, which is done independently from the application program 318. This function is incorporated in the platform 305c in this embodiment.

Figure 14:
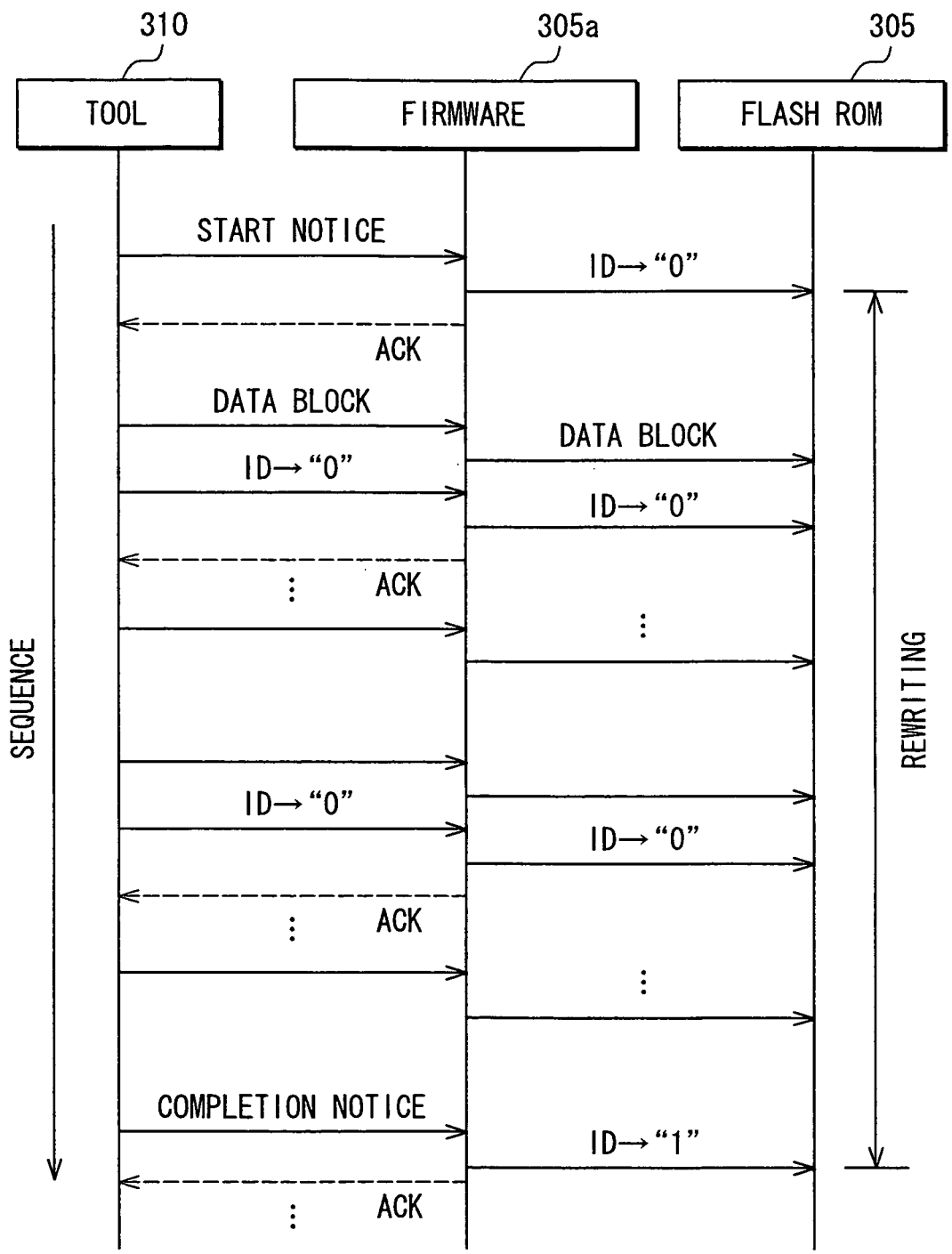
FIG. 14 is a schematic diagram of rewrite processing.

FIG. 14 shows schematically one example of the simplest case of the rewrite processing by the rewriting firmware 305a. As shown in FIG. 12, here, the identifying ID shall be composed of a 1-bit data, wherein "0" is assigned to under-rewriting and "1" is assigned to rewriting completion (naturally, the correspondence may be done conversely) and other states shall not be identified. By receiving a notice of rewriting start, as shown in FIG. 12, from the rewriting tool 310 (data sender apparatus) connected to the connector 309, the rewriting firmware 305a is started. The rewriting firmware 305a, in its start, invalidates the storage state of the identifying ID storage part 401a in FIG. 11 as of before start of the firmware. It is considered that there are various ways to implement this invalidation method. In this embodiment, the identifying ID is reset to "0" indicating under-rewriting. As a result, in the identifying ID storage part 401a, its invalidated state becomes substantially equivalent to a content indicating under-rewriting. In other words, it can be said that processing of invalidating a storage state before the start of the firmware is also used for processing of setting the storage state to "0" indicating under-rewriting. It is also possible to invalidate the identifying ID storage part 401a regardless of the memory content thereof by providing an identifying ID storage part invalid flag separately and establishing a flag value indicating the invalidation. In this case, resetting this identifying ID storage invalid flag makes the identifying ID storage part 401a valid, showing the under-rewriting state that reflects the memory content.

On the other hand, when the rewriting firmware 305a received a notice of rewriting completion from the rewriting tool 310 and has normally completed the rewrite processing of the application program 318 in the flash memory ROM 305, the rewriting firmware 305a sets a storage state of the identifying ID storage part 401a to a predetermined rewriting-normally-completed state "1" indicating that the rewriting has normally completed. Subsequently, when the application program 318 is intended to be started again by resetting the ECU 301, the platform 305c permits the start of the application program 318 only when the memory content of the identifying ID storage part 401a is the rewriting-normally-completed state "1."

Meanwhile, the rewriting firmware 305a maintains the under-rewriting state "0" being set in the identifying ID storage part 401a until the rewrite processing of the application program 318 is normally completed. When the rewrite processing has been interrupted halfway, the memory content of the identifying ID storage part 401a is still in the rewriting state "0." When the ECU 301 is reset after that, the platform 305c checks that the memory content is the under-rewriting state "0," starts the rewriting firmware 305a without starting the application program 318 currently being in an incomplete under-rewriting state, acquires the data of the update version program from the rewriting tool 310 once more, and performs the rewrite processing using it.

As described above, the rewriting firmware 305a acquires the update version program of the application program 318 to be used for rewriting from the program rewriting tool (data sender apparatus) 310 connected to the ECU 301 through a network by communication and performs rewriting with it. The program rewriting tool 310 outputs continuously an instruction of maintaining a state of rewriting (namely, an instruction that instructs to maintain a value of the identifying ID at "0") to the rewriting firmware 305a during the above rewrite processing. The rewriting firmware 305a receives the above instruction of maintaining a state of rewriting and maintains the memory content of the identifying ID storage part 401a at the under-rewriting state ("0").

Specifically, the rewriting tool 310 sends sequentially the update version program as divided into blocks 402b to the rewriting firmware 305a of the ECU 301. Each time sending one block, the tool 310 continuously issues and sends a corresponding instruction of maintaining a state of rewriting. The rewriting firmware 305a writes a received block in the flash ROM 305, and at the same time continues to maintain the identifying ID value at "0" receiving the instruction of maintaining a state of rewriting sent thereto as occasion arises. It is noted that, although the rewriting firmware 305a has received the data block, when, due to some cause, the instruction of maintaining a state of rewriting has been ceased, the rewriting firmware creates an error log and ends the processing.

Moreover, when the rewriting firmware 305a has written the whole update version program in the flash ROM 305 received by the rewriting firmware 305a, the program rewriting tool 310 starts the transmission of verifying data for verifying the sent update version program data. The verifying data may be either one that is the same as the update version program data or data for error check made by processing the update version program, such as a checksum code. Also regarding this verifying data, the program rewriting tool 310 continues to issue and send an instruction of maintaining a state of rewriting for each block. The rewriting firmware 305a, in response to the above verifying data, verifies the update version program data already written in the flash ROM 305. In response to an instruction of maintaining a state of rewriting, the firmware 305a maintains the identifying ID at the under-rewriting state "0." Then, when verification of the whole update version program is completed, the rewriting firmware 305a will rewrite the identifying ID as rewriting-normally-completed state, i.e., "1."

Figure 15:
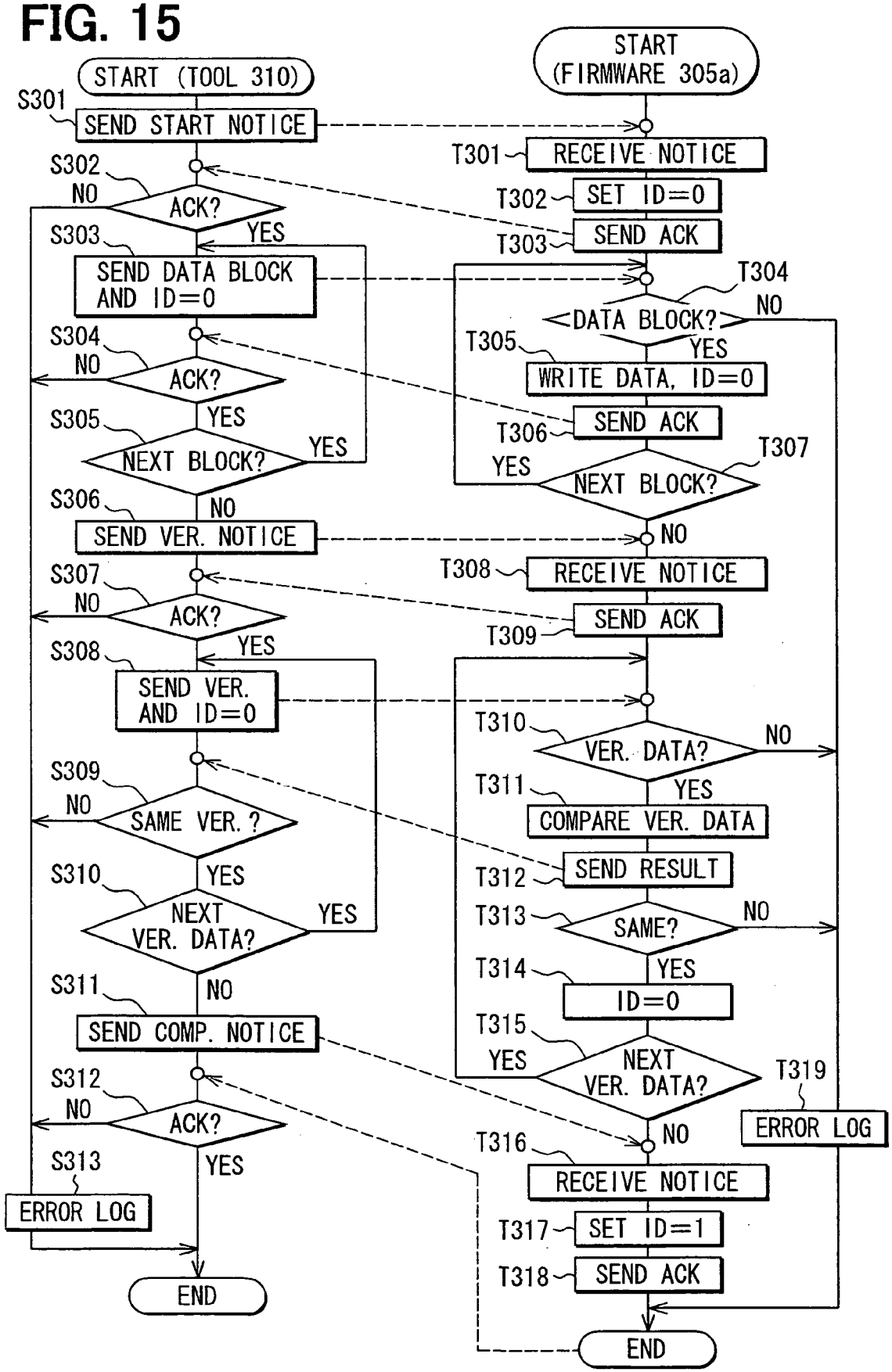
FIG. 15 is a flowchart showing a first example concerned with details of the rewrite processing.

In FIG. 15, the processing of the rewriting tool 310 is shown in the left hand, and the processing of the rewriting firmware 305a in the right hand, with time series of the execution step being almost coincided, and communication flows of information between the rewriting tool 310 and the ECU 301 are shown by broken lines. The step numbers are shown by "S##" on the rewriting tool 310 side and by "T##" on the rewriting firmware 305a side. In order to make it easy to grasp which flow is currently explained, the explanation of the rewriting tool and the explanation of the firmware will be given in separate paragraphs, respectively. Moreover, a transmission destination when "transmission" is referred to in the rewriting tool side always indicates the firmware 305a; a transmission destination when "transmission" is referred to in the firmware side always indicates the rewriting tool 310.

(Rewriting tool) A notice of rewriting start is sent at step S301.

(Firmware) The notice of rewriting start is received at step T301, the invalidation described above is conducted by setting the identifying ID to "0" ("0" also used for setting of writing). The acknowledge signal ACK is returned at step T303.

(Rewriting tool) At step S302, it is checked whether the acknowledge signal ACK is received. A data block to be transmitted is sent at step S303 and an instruction of maintaining a state of rewriting for maintaining the identifying ID at "0" is sent.

(Firmware) At step T304, the data block is received. The data is written in the flash ROM 305 and the identifying ID is maintained at "0" at step T305. The acknowledge signal ACK is returned at step T306.

(Rewriting tool) At step S304, the acknowledge signal ACK is received. It is checked whether there is the next data block at step S305. When the result is YES, processing of steps S303 and S304 is repeated. Otherwise, when there is no next data block at step S305, the processing proceeds to step S306, where a notice of verification start is sent.

(Firmware) When the next data block is received at step T307, processing of step S T304-T306 is repeated. Otherwise, when there is no next block at step T307, the processing proceeds to step T308, where the notice of verification start is received, and the acknowledge signal ACK is returned at step T309.

(Rewriting tool) The acknowledge signal ACK is received at step S307, verifying data to be transmitted (data corresponding to the already sent data will be sent sequentially) is sent at step S308, and the instruction of maintaining a state of rewriting for maintaining the identifying ID at "0" is sent. The verification data corresponding to the already sent data blocks will be sent sequentially in the next and subsequent step S.

(Firmware) At step T310, the verifying data is received. It is compared with corresponding data block written in the flash ROM 305 at step T311, and the result is sent at step T312 (this transmission also serves as acknowledge to the verifying data reception).

(Rewriting tool) At step S309, receiving the above comparison result, it is checked whether the result shows agreement (same verifying data). When the result is agreement, it is checked whether there is next verifying data at step S310. When the result is YES, the processing at steps S308 and S309 is repeated. Otherwise, when there is no next verifying data at step S310, the processing proceeds to step S311, where a notice of rewriting completion is sent. On the other hand, when the result shows disagreement at step S309, the processing proceeds to step S313, where an error log is created and the processing is ended.

(Firmware) When the data block agrees with the verifying data at step T313, the processing proceeds to step T314, where the identifying ID is maintained at "0." When there is the next verifying data at step T315, processing of step T310 to T31.4 is repeated. Otherwise, when the result shows disagreement at step T313, the processing proceeds to step T319, where an error log is created and the processing is ended. On the other hand, when there is no next verifying data at step T315, the processing proceeds to step T316, where a notice of rewriting completion is received. Then the identifying ID is set to "1" at step T317, and an acknowledge signal ACK is returned at step T318. In addition, also when necessary data is not normally received from the rewriting tool at steps T304 and T310, the processing proceeds to step T319 after a predetermined number of retrials, where an error log is created and the rewriting is ended.

(Rewriting tool) When an acknowledge signal ACK is received at step S312, the processing is ended. In addition, when there is no acknowledge signal ACK at steps S302, S304, S307 and S312, the processing proceeds to step T313 after a predetermined number of retrials, where an error log is created and the processing is ended.

Figure 16:
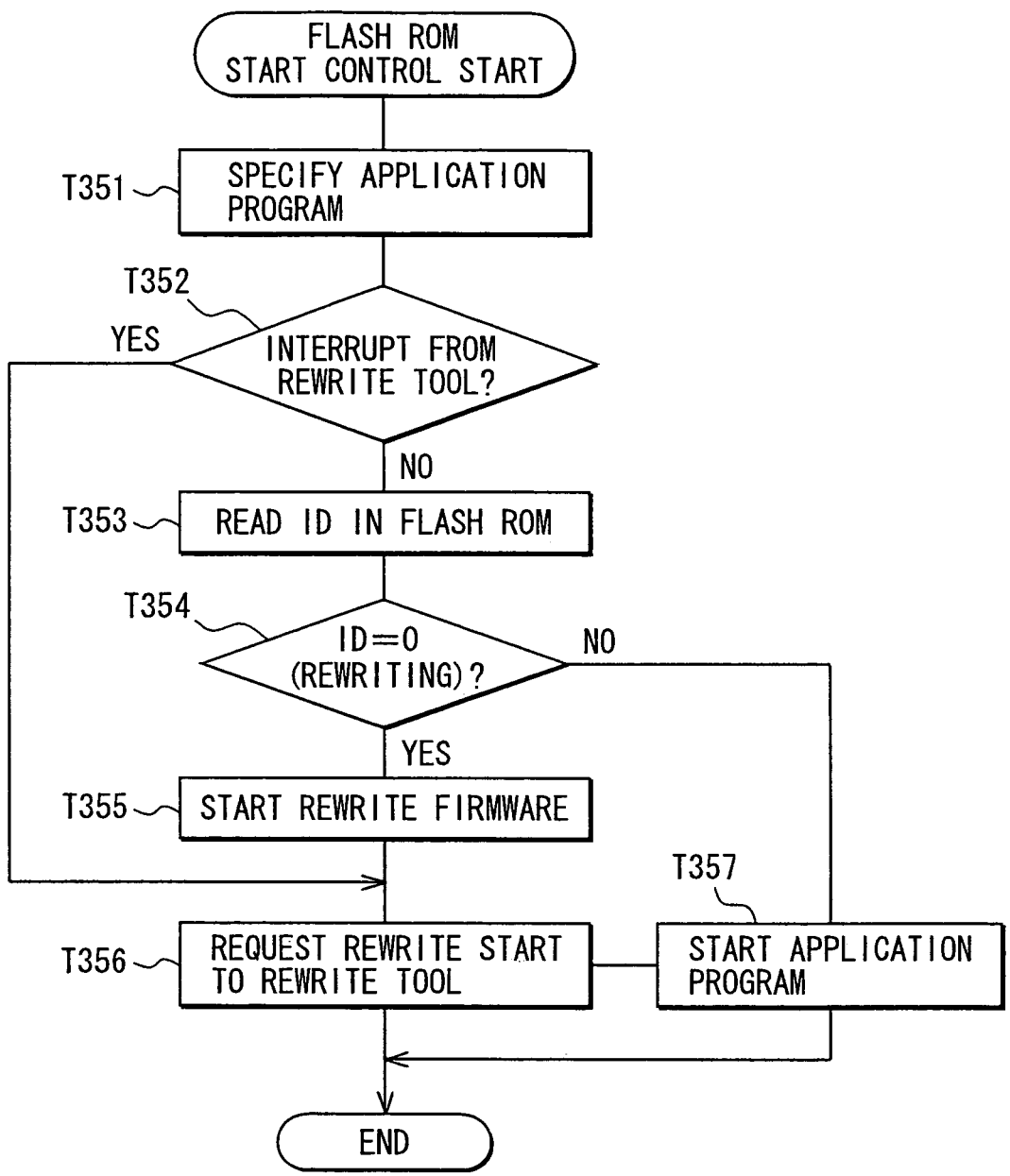
FIG. 16 is a flowchart showing start control processing that corresponds to the rewrite processing of FIG. 15.

When the rewrite processing by the update version program has completed in the above way, start processing after the reset on and after the next time will be as shown in FIG. 16 by the start controlling program routine run by the platform 305c. First, the name of the application program to be started is specified at step T351. At the time of an initial trial of rewriting by the rewriting tool 310, the content of the rewriting ID should be "1" indicating normal completion, and therefore a logic of shifting to the rewrite processing is not true from determination of the content of the rewriting ID. Accordingly, first, it is checked whether there is an interrupt request to start the rewriting firmware from the rewriting tool 310 (data sender apparatus) at step T352. When there is no interrupt request, the processing proceeds to step T353, where the identifying ID corresponding to the application program is read in the flash ROM 305. When the identifying ID is "1" (normal completion), the processing proceeds to T357, where the application program is started. On the other hand, when the identifying ID is "0" (under-rewriting), it indicates that the last rewrite processing has not normally completed, and consequently, the processing proceeds to step T355, where the rewriting firmware 305a is started to request the rewriting tool to start the rewrite processing program at step T356 (indicated by the left-hand flow in FIG. 15). On the other hand, when there is the interrupt request at step T352, the processing skips steps T353-T355 and proceeds to step T356, where start of the rewrite processing program is requested to the rewriting tool.

Various modification embodiments are possible, as described below, using the above processing example as a base. First, the rewriting firmware 305a can be configured to, when the rewrite processing is interrupted during the verification, set the memory content of the identifying ID storage part 401a to the under-rewriting state in such a way that the interruption can be specified as interruption during verification. Corresponding to this, the platform 305c can be configured to restart the rewriting firmware 305a so that the rewrite processing is resumed from the verification processing. FIG. 13 shows a setting example of the identifying ID of this case. In order to identify three or more under-rewriting states, the identifying ID shall be two or more bits, in this case 2 bits, wherein "00" is assigned to represent an unrewritten or still-rewriting state (also used to represent the invalidation), "01" to represent a rewritten-unverified (still verifying) state, "00" to represent a rewriting-normally-completed state (both rewriting and verification completed).

Figure 17:
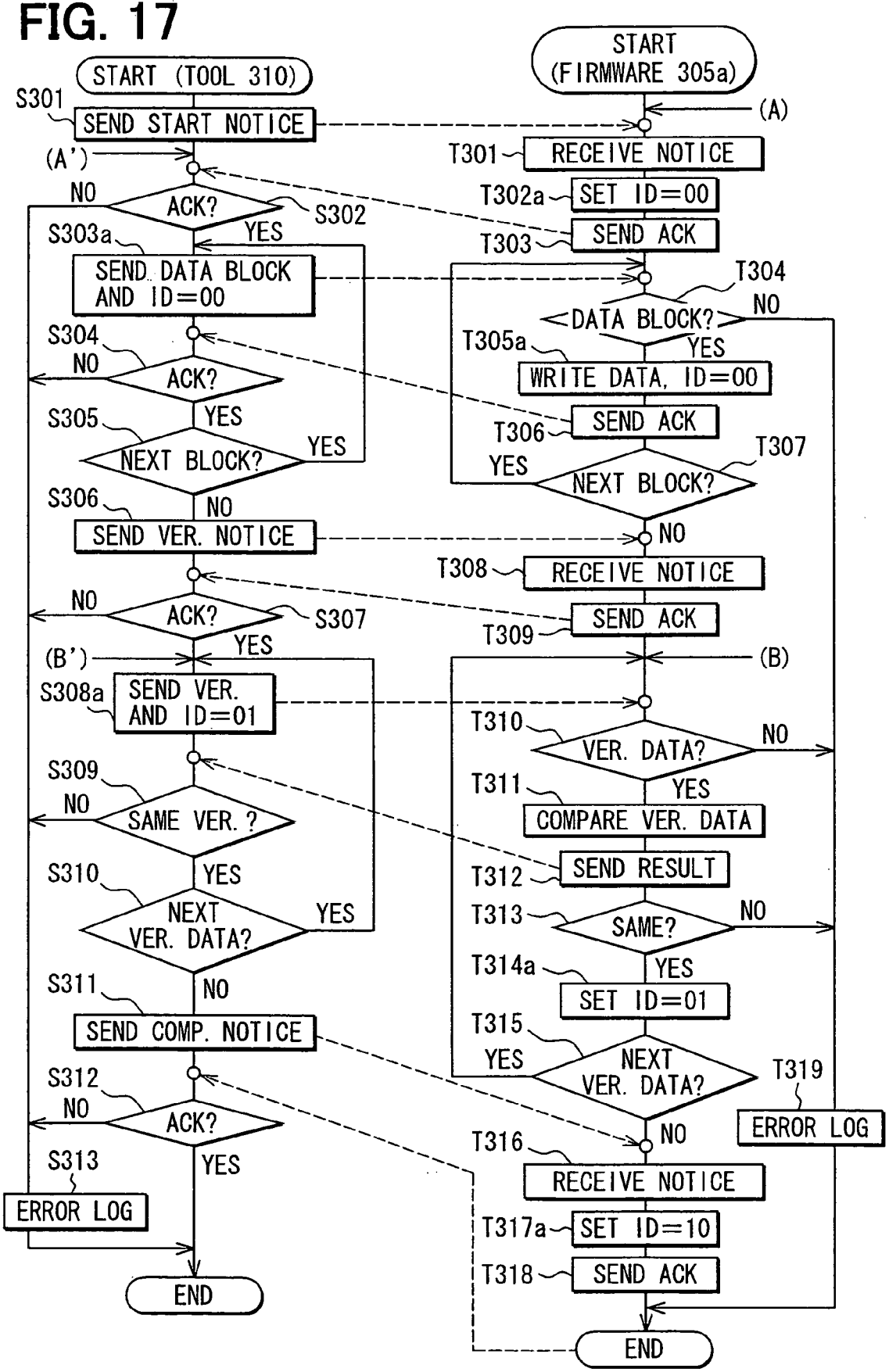
FIG. 17 is a flowchart showing a second example concerned with details of the rewrite processing.

FIG. 17 shows a flow of the rewrite processing of this modification. Since there are many steps common to those in FIG. 15, steps whose processing contents are the same of those of FIG. 15 are designated with the same step numbers and detailed explanations thereof will be omitted. Moreover, steps whose processing contents are different from those of the steps of FIG. 15 are additionally given "a" for the step numbers in order to make clear a corresponding relation to FIG. 15.

Steps S303a, T302a, T305a and T317a are not different to corresponding steps in FIG. 15 in essential processing, except that the identifying ID "0" that indicated in rewriting now changed to the unrewritten "00" and the identifying ID indicating rewriting completion changes to "10" from "1." On the other hand, at steps S308a and T314a concerned with the verification, the processing of FIG. 15 only conducts the processing of maintaining "0" indicating under-rewriting; this processing here newly sets "01" indicating rewritten-unverified. As a result, when the processing has been interrupted during the writing of the update version program, the identifying ID is set to "00." When it has been interrupted during the verification, the identifying ID is set to "01." These two cases can be differentiated.

Figure 18:
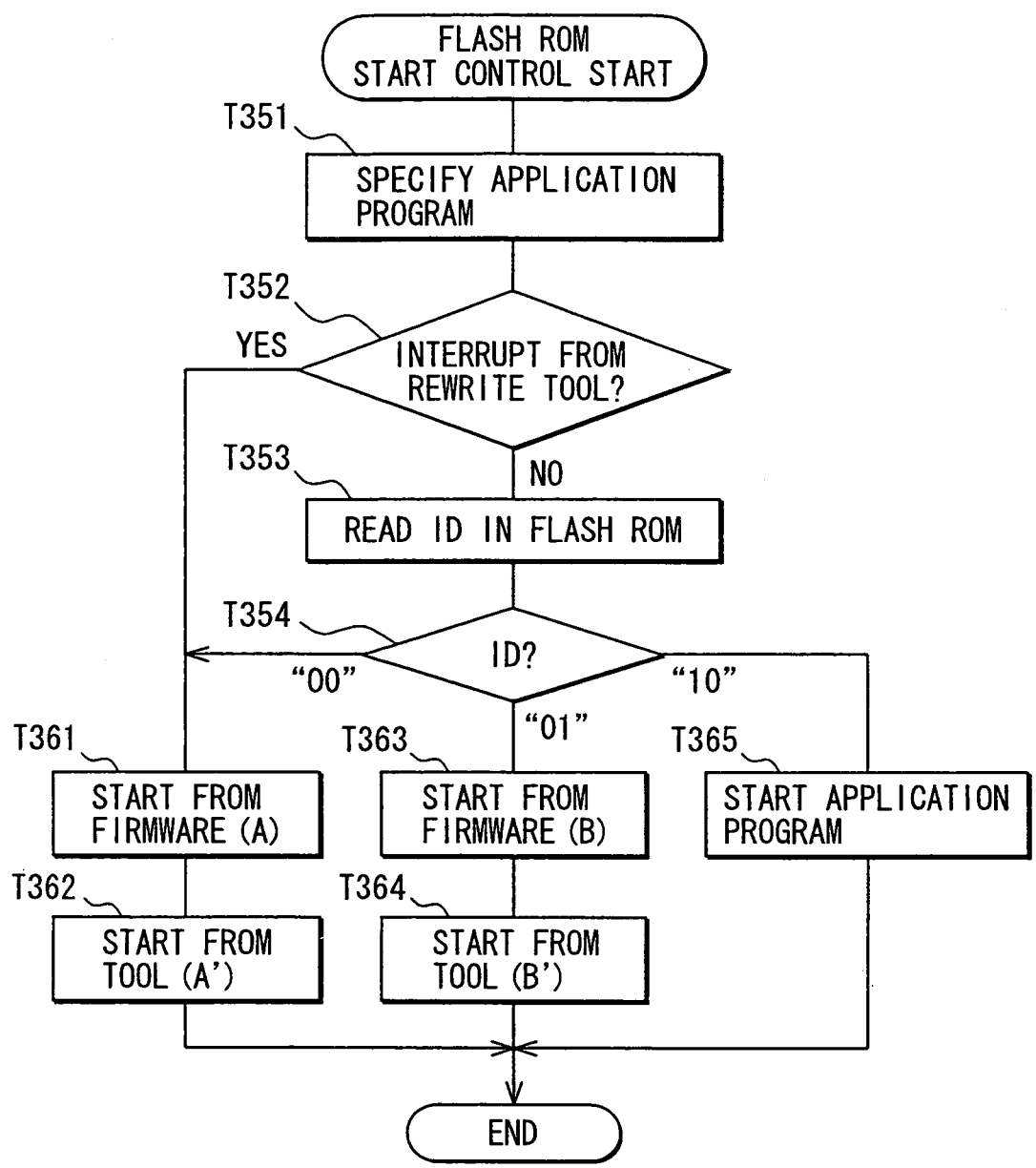
FIG. 18 is a flowchart showing start control processing that corresponds to the rewrite processing of FIG. 17.

FIG. 18 shows an after-reset start processing of this case. When there is no interrupt request for the starting of rewriting firmware from the rewriting tool 310 (data sender apparatus) at step T352, the identifying ID is read at step T353. When the content is "00," programs of both the rewriting tool and the rewriting firmware are started from tops, that is, locations (A) and (A') in FIG. 17, the rewrite processing of the update version program and subsequent steps are repeated again (steps T361, T362). On the other hand, when the content of the identifying ID is "01," the programs of both the rewriting tool and the rewriting firmware are started from a verification processing step, that is, locations (B) and (B'), and only the verification processing is repeated in FIG. 17 (steps T363, T364). When the content of the identifying ID is "10," the application program (update version program) is started. It is noted that when there is an interrupt request at step T352, the processing proceeds to T361.

Figure 19:
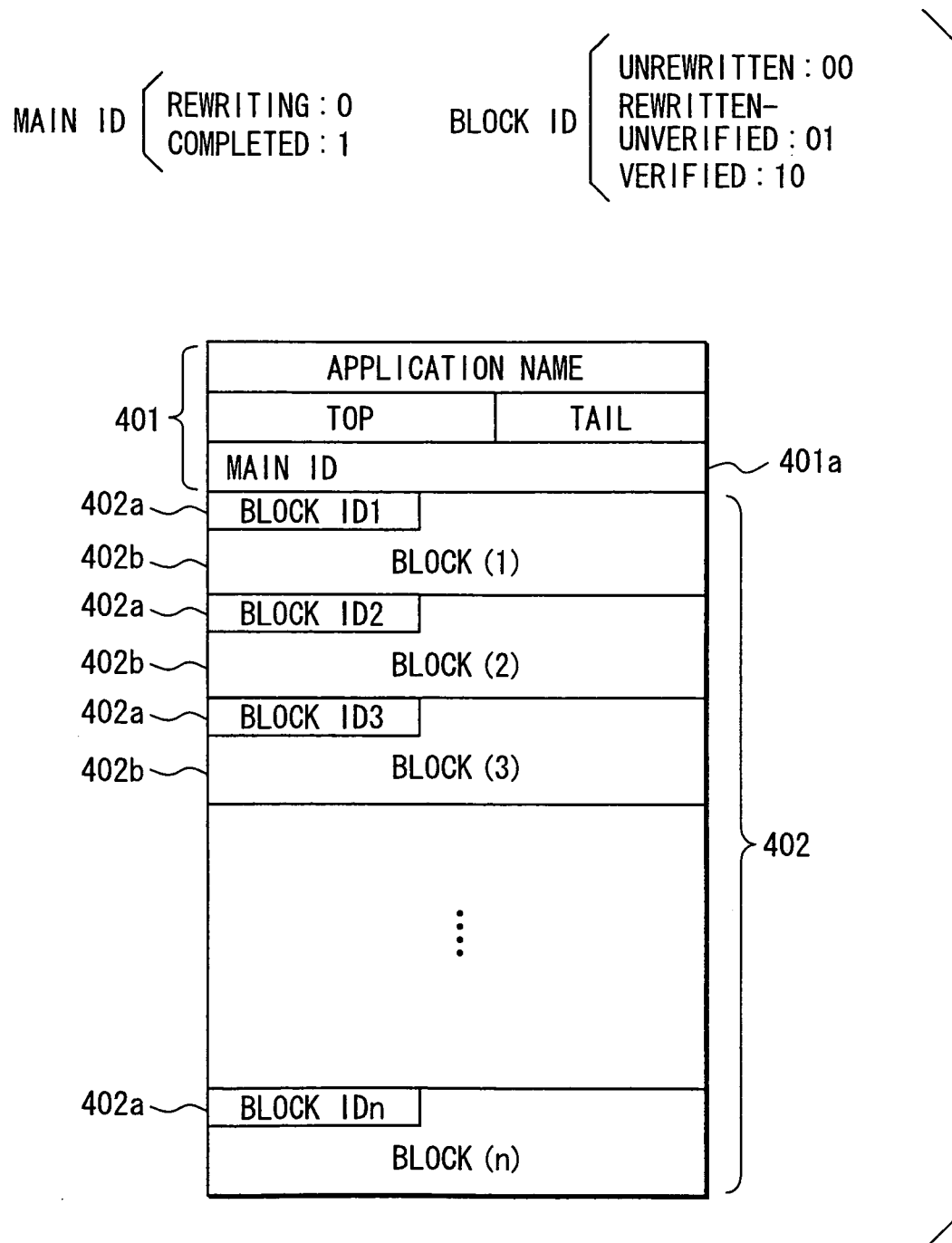
FIG. 19 is an explanatory diagram showing an example of forming block-based identifying ID storage parts in storage areas of respective blocks in an application program storage area.

Next, the rewriting firmware 305a may be configured to, when the rewrite processing of the application program into the flash ROM 305 is interrupted halfway, set the memory content of the identifying ID storage part 401a in the under-rewriting state in such a way that an interruption location of the rewrite processing (including verification processing of written data in addition to write processing into the flash ROM 305) is identifiable. In this case, the platform 305c identifies the interruption location for the memory content of the identifying ID storage part 401a and restarts the rewriting firmware 305a so that the rewriting is resumed from the interrupted location. Specifically, as shown in FIG. 19, a plurality of identifying ID storage parts 401a can be provided corresponding to blocks of the update version programs 402b, respectively. The rewriting firmware 305a can be configured to set storage states of the plurality of identifying ID storage parts 401a to the rewriting-normally-completed states sequentially on a first-completion first-setting basis "10". The platform 305c shall restart the rewriting firmware 305a in such a way that the rewrite processing is resumed from the block 402b whose storage state of the identifying ID storage part 401a is not set to the rewriting-normally-completed state "10".

In FIG. 19, a storage area of the flash ROM 305 for the application program 318 has a formation of block-based identifying ID storage parts 402a each used to identify a state of each block 402b at a predetermined address in a storage area of each block 402b, individually. Moreover, the storage area has a formation of the main identifying ID storage part 401a used for identifying an under-rewriting state of the whole update version program in addition to the block-based identifying ID storage parts 402a. In FIG. 19, the storage part 401a is in the header 401. Among these, a main (primary) identifying ID is configured to allow the whole program to be identified in either of only two states: under-rewriting "0" ("0" is also used to represent the invalidation); and rewriting normal completion "1" (therefore, it is 1-bit data). On the other hand, the block-based identifying ID is configured to allow each block to be identified in one of three states of the each block: unrewritten "00" (also used to represent the invalidation); rewritten-unverified "01"; and rewriting-normally-completed "10" (therefore, it is 2-bit data).

Figure 20:
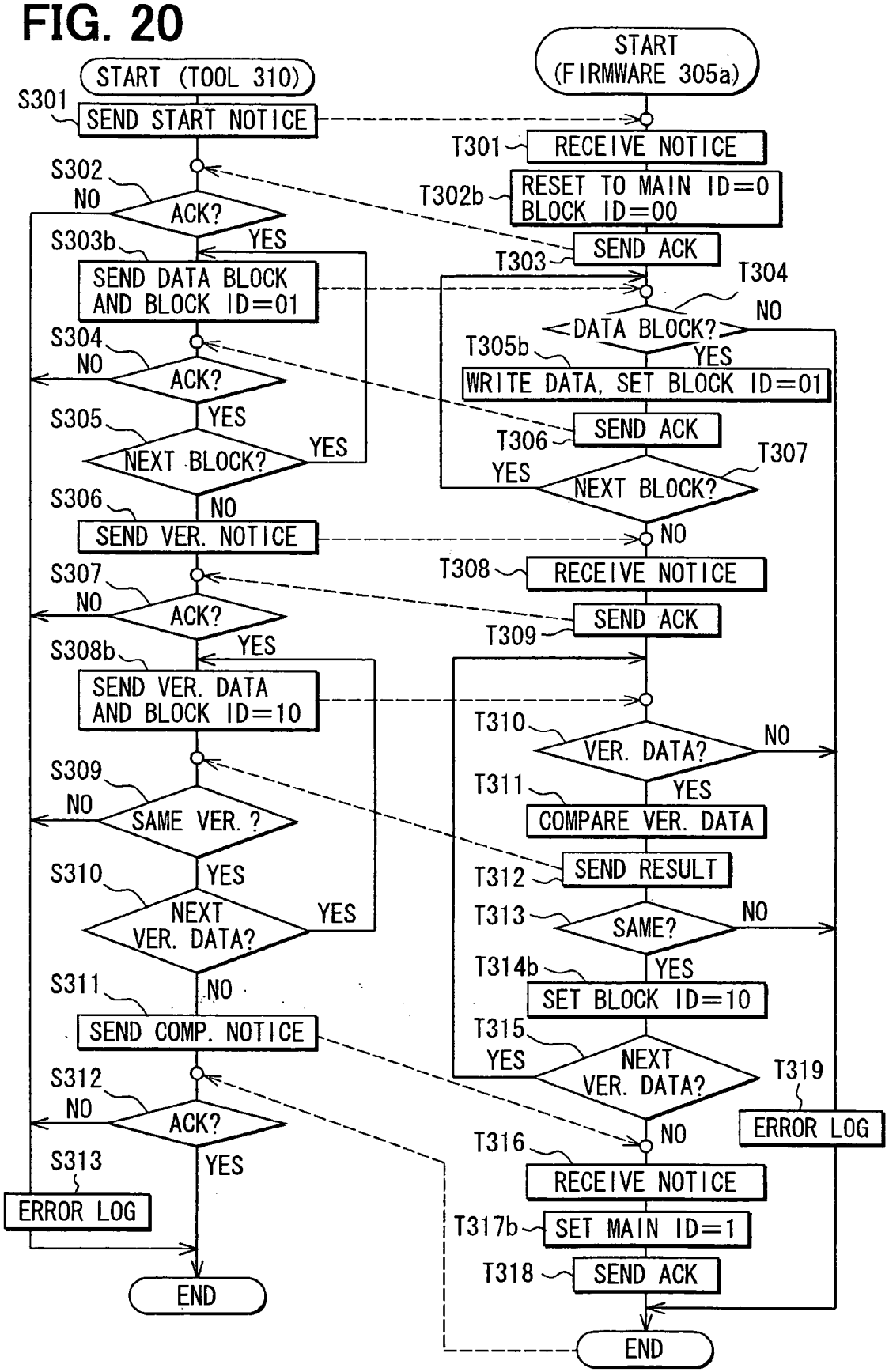
FIG. 20 is a flowchart showing a fourth example concerned with details of the rewrite processing.

FIG. 20 shows rewrite processing in this case. Steps of FIG. 20 different from those of the steps of FIG. 17 are additionally given "b" for the step numbers in order to make clear a corresponding relation to FIG. 17. Hereafter, explanation will be given focusing on steps given this "b."

At step T302b on the firmware side, when a notice of rewriting start is received, the main identifying ID is reset to "0," all the block-based identifying IDs are reset to "00" to invalidate a previous history. Steps S303b, S308b, T305b, and T314b are almost the same as corresponding steps of FIG. 17, respectively, in essential processing. However, the identifying ID shall be set to "00" when the rewriting state is before rewriting (unrewritten) and set to "01" when the rewriting state is the rewritten-unverified in the identifying ID storage part of a block concerned with current processing, not in a single identifying ID storage part irrelevant to the block. Each time the writing/verification of a block makes progress, the setting will be conducted in the identifying ID storage part of a corresponding block sequentially. When all the blocks have undergone the verification, the main identifying ID will be set to the rewriting-normally-completed "1" at step T317b.

Figure 21:
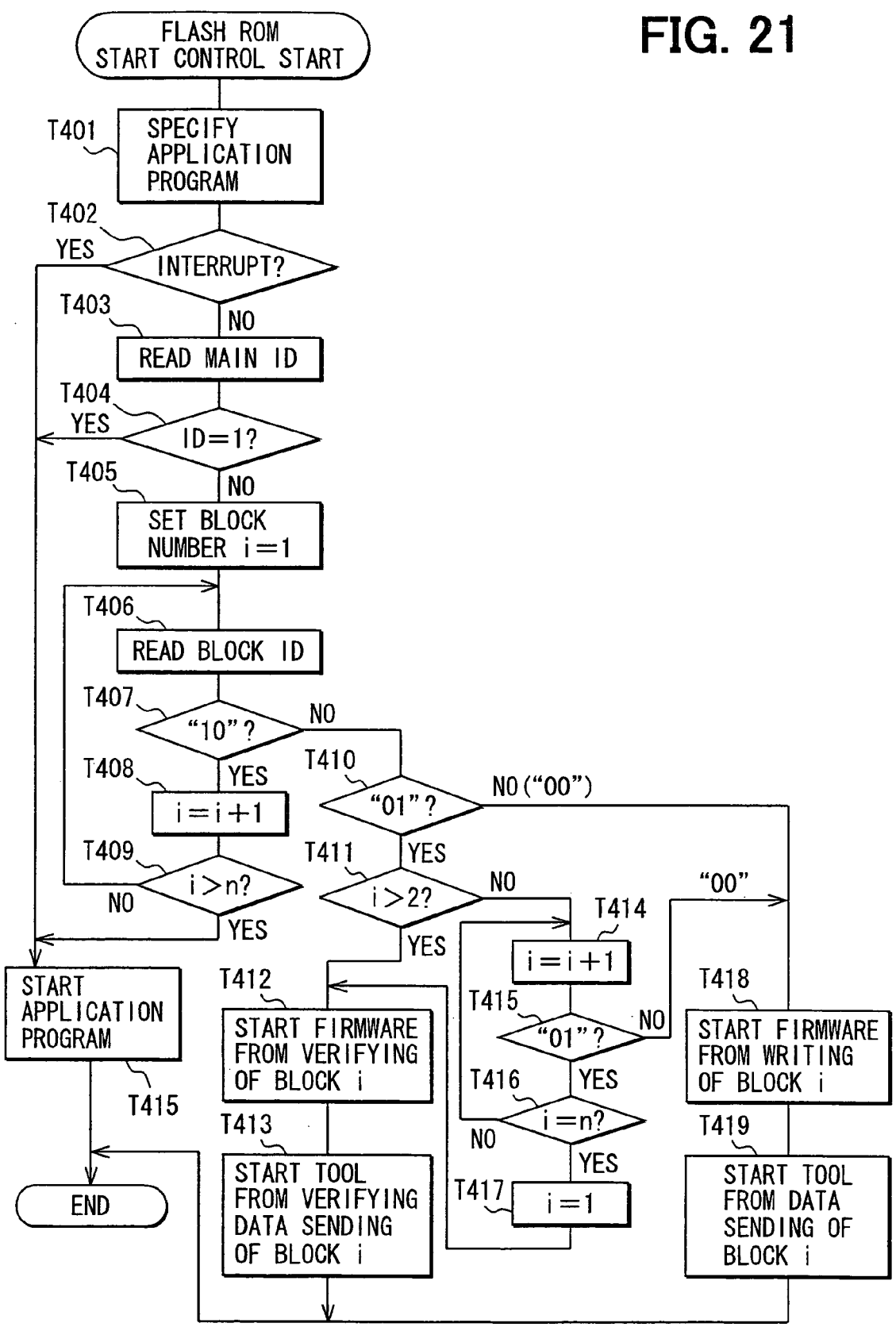
FIG. 21 is a flowchart showing start control processing that corresponds to the rewrite processing of FIG. 20.

FIG. 21 shows start processing after the reset of this case; the name of the application program is specified at step T401, and the main identifying ID is read at step T403 when there is no interrupt request to start the rewriting firmware from the rewriting tool 310 (data sender apparatus) at step T402. At step T404, when the content of the main identifying ID is "1," the application program (update version program) is started. Thus, by using the main identifying ID separately from the block-based identifying ID, it can be determined immediately whether the rewriting has been normally completed without referring to the contents of multiple block-based identifying IDs, and the processing can shift to the start processing of the application program quickly.

On the other hand, when at step T404, the content of the main identifying ID is "0," the processing shifts to analysis processing of the identifying ID at step T405 and subsequent steps. Basically, the process identifies an interruption location of writing or verification (interruption block) by tracing the blocks in the order of writing (and verification) and finding out at which block the content of the block-based identifying ID changes. First, the block number "i" is initialized at step T405, a block-based identifying ID is read at step T406, and its content is checked at step T407. Considering a logic in which writing and verification are sequentially conducted in a predetermined block array, when the content of the block-based identifying ID is the rewriting-normally-completed "10" at step T407, at least verification should have completed in block after that. Accordingly, the block number is incremented at step T408 to return to step T406 and the processing after that step is repeated. Moreover, when at step T409, "i" is "n" (last block), it indicates that all the blocks has normally rewritten, and therefore the processing proceeds to step T415, where the application program is started. Furthermore, when the content of the block-based identifying ID is the unrewritten "00" at step T407, the firmware and the rewriting tool are started so that the rewriting is resumed from that block (steps T418, T419).

When the content of the block-based identifying ID read at step T406 is the rewritten-unverified "01," the existence of a block with the rewriting-normally-completed "10" has been checked. Therefore, the rewriting of further blocks has normally completed, and all blocks ahead of the current block are the rewritten-unverified, provided that the block is not a top block (at step T411, the determination is YES). Therefore, the processing proceeds to step T412 and step T413, where the firmware and the rewriting tool are started so that the verification is resumed from that block.

On the other hand, when the block with the rewritten-unverified "01" is a top block at step T411, the processing proceeds to step T414, where it is checked at which block the identifying ID changes to the unrewritten "00" (T415); when all the blocks up to the last block are the rewritten-unverified "01," the firmware and the rewriting tool are started so that the verification is resumed from the first block (T416, T417 to T412). On the other hand when it is turned out that the identifying ID is the unrewritten "00" from a block halfway at step T415, the processing proceeds to step T418, where the firmware and the rewriting tool are started so that the rewriting is resumed from that block (at steps T418 and T419).

Figure 22:
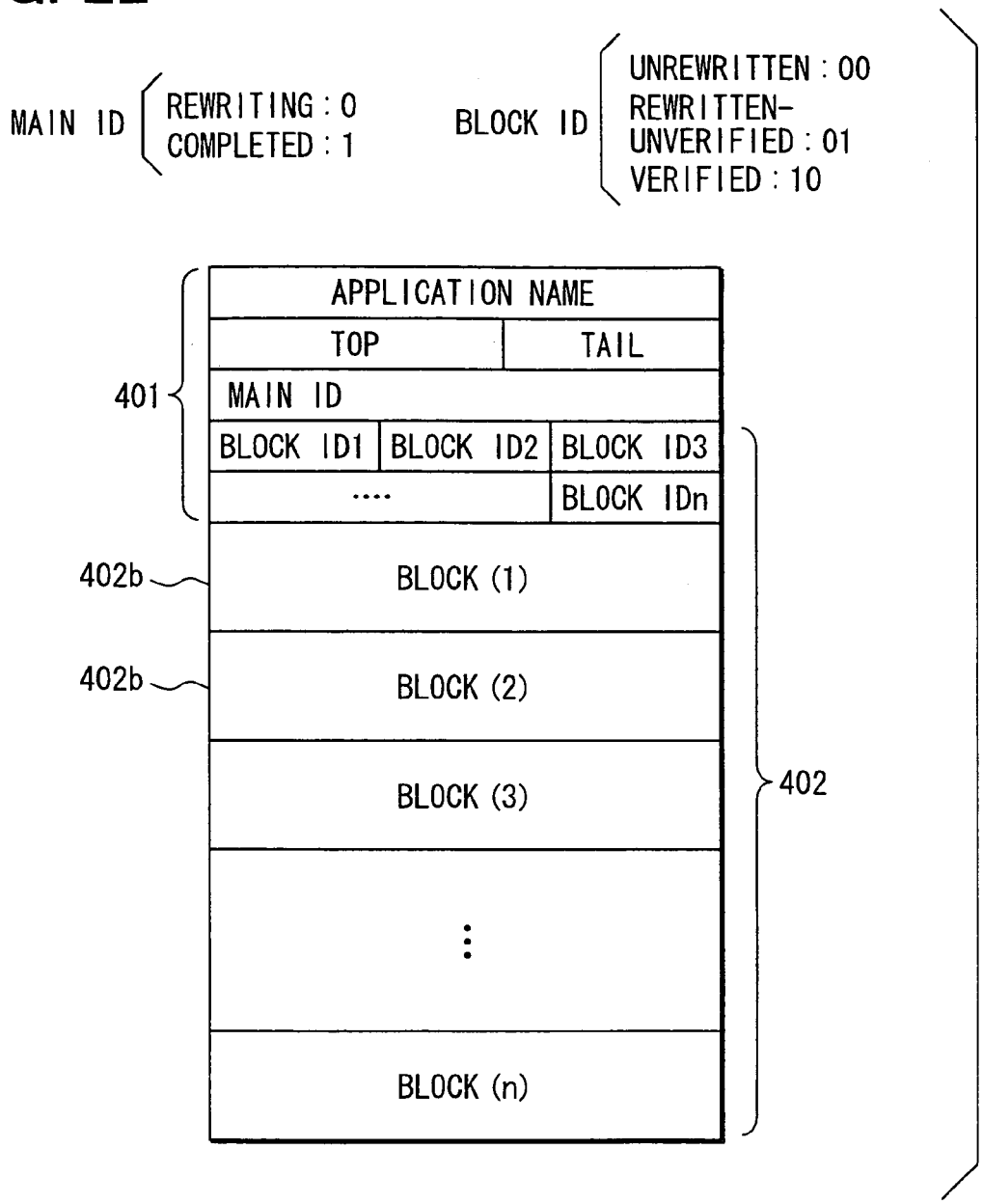
FIG. 22 is an explanatory diagram showing an example in which the block-based identifying ID storage parts of respective blocks are formed outside the block storage areas collectively.
Figure 23:
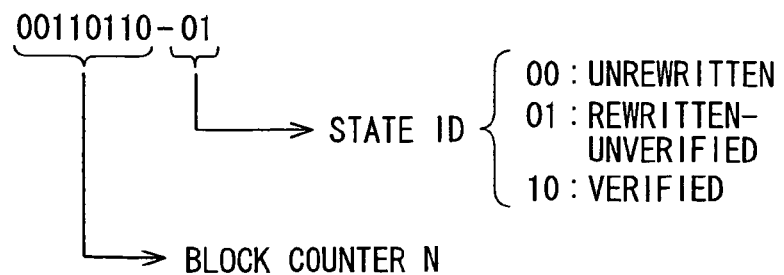
FIG. 23 is a diagram showing rewriting identifying information of a combination of a block counter and the identifying ID.

As a further modification, as shown in FIG. 22, the block-based identifying ID storage may be separated from the storage areas of the blocks, and may be formed in the form of another table. In FIG. 22, a set of all the block-based identifying ID storage parts are formed along with the main identifying ID in the header 401. Alternatively, without providing the identifying IDs in separated blocks, rewriting-state identifying information may be formed by combining information specifying a block currently under processing and information of its processing state. In an example of FIG. 23, a block counter N that is incremented each time the processing proceeds to processing of the next block and the state ID are combined. The identifying ID indicates the state of a block indicated by the block counter N, and is configured to be able to identify three states: the unrewritten state "00" ("00" is also used to represent the invalidation); the rewritten-unverified state "01"; and the rewriting-normally-completed state "10."

Figure 24:
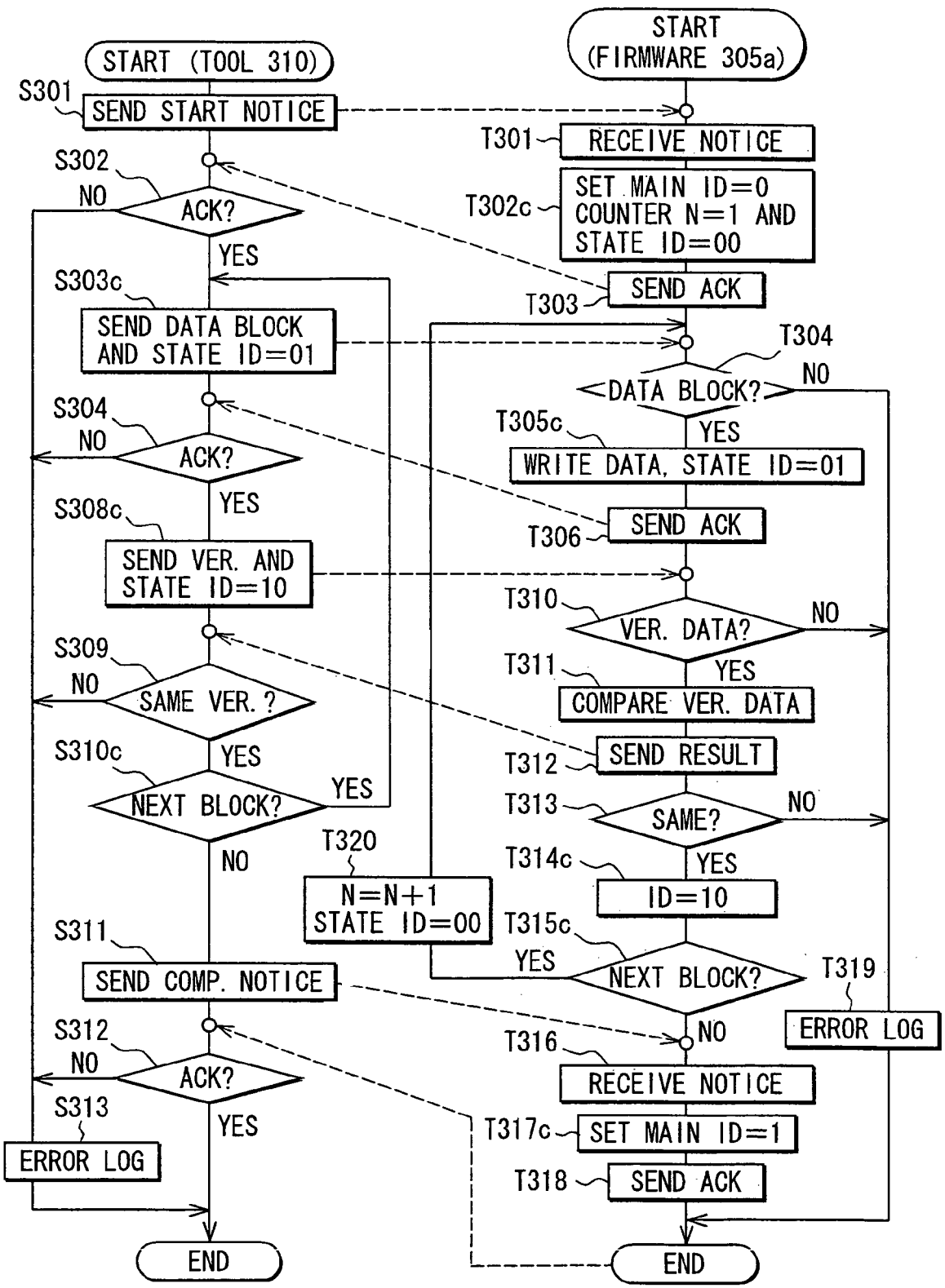
FIG. 24 is a flowchart showing a fifth example concerned with details of the rewrite processing.

FIG. 24 shows rewrite processing of this case. The steps in FIG. 24 different from the steps in FIG. 20 in processing content are additionally given "c" to the step numbers in order to make clear a corresponding relation to FIG. 20. Hereafter, explanation will be given focusing on steps given this "c."

At step T302c on the firmware side, when a notice of rewriting start is received, the main identifying ID is set to "0," the block counter N is set to "1," and the state ID is set to "00," respectively, and past records are made invalid. Steps S303c, S308c, T305c and T314c are almost the same as the steps corresponding to those in FIG. 20 in essential processing, but a single identifying ID being not related to the block is used. As the processing shifted to processing of a further block, a state value of a block indicated by the block counter N is written in the identifying ID, updating its value. In the processing here, when writing of a certain block is ended, processing of verifying the block shall be conducted. That is, as the processing progresses from rewriting to verification with the value of the block counter N being fixed, the value of the identifying ID is rewritten from "01" to "10." Then, when shifting to processing of the next block at step T320, the block counter N is incremented and the value of identifying ID is invalidated again ("00"). Then, when verification of the last block has ended, the processing proceeds to step T317c, where the main identifying ID is set to "1."

In after-reset start processing of this case, when the main identifying ID is "0" (under-rewriting), it can be immediately grasped by reading the value of the block counter N and the identifying ID, in which block and to which state the processing has proceeded. For example, in FIG. 23, since N is 54 (by 10 combination) and the state ID is "01," these indicate that the processing has been interrupted at the rewriting of the 54-th block. Therefore, what is necessary for subsequent processing is just to resume the processing from verification of the 54-th block.

The above embodiments will be modified further in many ways without departing from the spirit of the invention.

What is claimed is:

1. An electronic control system for an automobile, comprising:
    a nonvolatile memory for storing function controlling software for handling control processing of electronic apparatuses mounted on an automobile whose memory content is electrically rewritable and that retains the memory content even when receiving an outside reset signal, the nonvolatile memory including rewriting firmware storage part that stores a rewriting firmware for rewriting the content of the function controlling software, and the nonvolatile memory further including rewriting-state identifying information storage part for storing rewriting-state identifying information with which it is identified whether rewrite processing of the function controlling software has normally completed in a rewritable manner;
    a RAM for serving as an execution memory of the function controlling software based on which the control processing of the electronic apparatuses are performed;
    identifying information rewriting means that controls a progress state of the rewrite processing by the rewriting firmware and, depending on the progress state, rewrites a memory content of rewriting-state identifying information in the rewriting-state identifying information storage part to enable to grasp whether the rewrite processing has normally completed; and
    start controlling means that refers to the memory content of the rewriting-state identifying information storage part in starting the function controlling software and that, when the memory content is a content indicating normal completion of the rewrite processing, starts the function controlling software, and, when the memory content indicates incomplete completion of the rewrite processing, executes processing of restarting the rewriting firmware instead of the function controlling software independently from the function controlling software; wherein
    the identifying information rewriting means sets the memory content of the rewriting-state identifying information storage part to a predetermined under-rewriting state indicating under-rewriting in response to the start of the rewrite processing of the function controlling software by the rewriting firmware, and maintains the under-rewriting state until the rewrite processing of the function controlling software is normally completed;
    the rewriting control means starts the rewriting firmware when the memory content of the rewriting-state identifying information storage part is under-rewriting state;
    the rewriting firmware is configured to acquire by communication an update version program of the function controlling software to be used for the rewriting from a data sender apparatus network-connected to the control system;
    the identifying information rewriting means is configured to maintain the memory content of the rewriting-state identifying information storage part at the under-rewriting state by receiving an instruction of maintaining a state of rewriting received from the data sender apparatus; and
    the identifying information rewriting means invalidates the storage state of the rewriting-state identifying information storage part as of before starting the rewriting firmware at the time of starting the firmware, and subsequently sets the storage state of the rewriting-state identifying information storage part to a predetermined rewriting-normally-completed state indicating the rewriting normal completion after the rewriting firmware normally completed the rewrite processing of the function controlling software in the nonvolatile memory;
    the start controlling means starts the function controlling software only when the memory content of the rewriting-state identifying information storage part is the rewriting-normally-completed state; and
    the identifying information rewriting means sets the storage state of the rewriting-state identifying information storage part to a rewriting-normally-completed state, when the rewriting firmware completes writing of a whole of the update version program received from the data sender apparatus in the nonvolatile memory and completes a verification of the update version program based on a comparison of the rewritten updated version program with a verifying data received from the data sender apparatus.

2. The control system according to claim 1, wherein:
    the identifying information rewriting means is configured to receive periodically the instruction of maintaining a state of rewriting from the data sender apparatus during a time from the start of the rewrite processing of the function controlling software to its normal completion, and configured to maintain the memory content of the rewriting-state identifying information storage part at the under-rewriting state in response to reception continuation of the instruction of maintaining a state of rewriting.

3. The control system according to claim 2, wherein:
the rewriting firmware is configured to receive the update version program as divided into blocks sequentially from the data sender apparatus; and
the identifying information rewriting means is configured to receive the instruction of maintaining a state of rewriting from the data sender apparatus for each block.

4. The control system according to claim 1, wherein:
the identifying information rewriting means sets the memory content of the rewriting-state identifying information storage part to an under-rewriting state in the form to enable to identify an interruption during the verification, when the rewrite processing by the rewriting firmware is interrupted during the verification; and
the start controlling means restarts the rewriting firmware so that the rewriting processing is resumed from the verification processing.

5. The control system according to claim 1, wherein:
the identifying information rewriting means sets the memory content of the rewriting-state identifying information storage part in the under-rewriting state to enable to specify in which block the rewriting processing has been interrupted, when the rewriting firmware has interrupted the rewriting processing in the nonvolatile memory by the function controlling software; and
the start controlling means specifies the interruption location from the memory content of the rewriting-state identifying information storage part and restarts the rewriting firmware so that the rewrite processing is resumed at the interruption location.

6. The control system according to claim 5, wherein:
the rewriting firmware receives the update version program as divided into a plurality of blocks sequentially from the data sender apparatus;
the identifying information rewriting means sets the memory content of the rewriting-state identifying information storage part to the under-rewriting state in the form that enables to specify in which block the rewriting processing has been interrupted, when the rewriting firmware interrupts halfway the rewriting processing in the nonvolatile memory by the function controlling software; and
the start controlling means specifies the block where the processing was interrupted from the memory content of the rewriting-state identifying information storage part and restarts the rewriting firmware so that the rewriting processing is resumed at that block.

7. The control system according to claim 6, wherein:
a plurality of the rewriting-state identifying information storage parts are provided corresponding to the blocks of the update version program;
the identifying information rewriting means sets a storage state of the plurality of the rewriting-state identifying information storage parts to the rewriting-normally-completed state sequentially on a first-completion first-setting basis; and
the start controlling means resumes the rewriting firmware in such a way that the rewriting processing is resumed from a block whose storage state of the rewriting-state identifying information storage part is not set to the rewriting-normally-completed state.

8. An electronic control system for an automobile, comprising:
a nonvolatile memory for storing function controlling software for handling control processing of electronic apparatuses mounted on an automobile whose memory content is electrically rewritable and that retains the memory content even when receiving an outside reset signal, the nonvolatile memory including rewriting firmware storage part that stores a rewriting firmware for rewriting the content of the function controlling software, and the nonvolatile memory further including rewriting-state identifying information storage part for storing rewriting-state identifying information with which it is identified whether rewrite processing of the function controlling software has normally completed in a rewritable manner; and
a RAM for serving as an execution memory of the function controlling software based on which the control processing of the electronic apparatuses are performed;
a control unit, comprising a computer processor, configured to:
control a progress state of the rewrite processing by the rewriting firmware and, depending on the progress state, rewrite a memory content of rewriting-state identifying information in the rewriting-state identifying information storage part to enable to grasp whether the rewrite processing has normally completed;
refer to the memory content of the rewriting-state identifying information storage part in starting the function controlling software and, when the memory content is a content indicating normal completion of the rewrite processing, start the function controlling software, and, when the memory content indicates incomplete completion of the rewrite processing, execute processing of restarting the rewriting firmware instead of the function controlling software independently from the function controlling software;
set the memory content of the rewriting-state identifying information storage part to a predetermined under-rewriting state indicating under-rewriting in response to the start of the rewrite processing of the function controlling software by the rewriting firmware, and maintain the under-rewriting state until the rewrite processing of the function controlling software is normally completed;
start the rewriting firmware when the memory content of the rewriting-state identifying information storage part is under-rewriting state;
acquire, via the rewriting firmware, by communication an update version program of the function controlling software to be used for the rewriting from a data sender apparatus network-connected to the control system;
maintain the memory content of the rewriting-state identifying information storage part at the under-rewriting state by receiving an instruction of maintaining a state of rewriting received from the data sender apparatus;
invalidate the storage state of the rewriting-state identifying information storage part as of before starting the rewriting firmware at the time of starting the firmware, and subsequently set the storage state of the rewriting-state identifying information storage part to a redetermined rewriting-normally-completed state indicating the rewriting normal completion after the rewriting firmware normally completed the rewrite processing of the function controlling software in the nonvolatile memory;
start the function controlling software only when the memory content of the rewriting-state identifying information storage part is the rewriting-normally-completed state; and set the storage state of the rewriting-state identifying in information storage part to a rewriting-normally-completed state, when the rewriting firmware completes writing of a whole of the update version program received from the data sender apparatus in the nonvolatile memory and completes a verification of the update version program based on a comparison of the rewritten updated version program with a verifying data received from the data sender apparatus.

* * * * *